US012677164B2

(12) United States Patent
Manolakos et al.

(10) Patent No.: US 12,677,164 B2
(45) Date of Patent: Jul. 7, 2026

(54) METHOD AND APPARATUS FOR PRIORITIZATION BETWEEN POSITION SERVICES AND RADIO COMMUNICATION SERVICES

(71) Applicant: QUALCOMM Incorporated, San Diego, CA (US)

(72) Inventors: Alexandros Manolakos, Escondido, CA (US); Mukesh Kumar, Hyderabad (IN); Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 508 days.

(21) Appl. No.: 18/000,190

(22) PCT Filed: Jul. 29, 2021

(86) PCT No.: PCT/US2021/043698
§ 371 (c)(1),
(2) Date: Nov. 29, 2022

(87) PCT Pub. No.: WO2022/026705
PCT Pub. Date: Feb. 3, 2022

(65) Prior Publication Data
US 2023/0199522 A1     Jun. 22, 2023

(30) Foreign Application Priority Data
Jul. 31, 2020    (IN) .............................. 202041032841

(51) Int. Cl.
*H04W 64/00*          (2009.01)
*H04W 24/02*          (2009.01)

(52) U.S. Cl.
CPC ........... *H04W 24/02* (2013.01); *H04W 64/00* (2013.01)

(58) Field of Classification Search
None
See application file for complete search history.

(56) References Cited

U.S. PATENT DOCUMENTS

| | | | |
|---|---|---|---|
| 2015/0208262 A1* | 7/2015 | Siomina | ................ H04W 24/10 370/252 |
| 2018/0054796 A1* | 2/2018 | Edge | ....................... H04W 4/02 |

(Continued)

FOREIGN PATENT DOCUMENTS

| | | |
|---|---|---|
| CN | 106576009 A | 4/2017 |
| CN | 108886448 A | 11/2018 |

(Continued)

OTHER PUBLICATIONS

3GPP TS 38.214: "3rd Generation Partnership Project, Technical Specification Group Radio Access Network, NR, Physical Layer Procedures for Data (Release 16)", 3GPP Standard, Technical Specification, 3GPP TS 38.214 V16.2.0 (Jun. 2020), 3rd Generation Partnership Project, Mobile Competence Centre, 650, Route Des Lucioles, F-06921 Sophia-Antipolis Cedex, France, vol. RAN WG1, No. V16.2.0, Jul. 20, 2020, XP051925549, pp. 1-163, clause 6.2.1.4, Section 1 Section 8.1.4.

(Continued)

*Primary Examiner* — Suhail Khan
(74) *Attorney, Agent, or Firm* — QUALCOMM Incorporated

(57) ABSTRACT
Method, apparatus and means for prioritized performance of at least one of a positioning session or a radio communication session at a user equipment, by the following steps: identifying (1210) an expected collision of the positioning session and the radio communication session; determining (1220) a priority between the positioning session and the radio communication session; and performing (1230) at least (Continued)

one of the positioning session or the radio communication session in accordance with the priority.

26 Claims, 12 Drawing Sheets

(56) References Cited

U.S. PATENT DOCUMENTS

| | | | |
|---|---|---|---|
| 2019/0053280 A1 | 2/2019 | Rico Alvarino et al. | |
| 2019/0239245 A1 | 8/2019 | Davydov et al. | |

FOREIGN PATENT DOCUMENTS

| | | |
|---|---|---|
| KR | 102112010 B1 | 5/2020 |
| WO | 2020153721 A1 | 7/2020 |
| WO | 2021194801 A1 | 9/2021 |

OTHER PUBLICATIONS

CATT: "Remaining Issues on UL SRS for NR Positioning", 3GPP Draft, R1-2003633, 3GPP TSG RAN WG1 Meeting #101, 3rd Generation Partnership Project (3GPP), Mobile Competence Centre, 650, Route Des Lucioles, F-06921 Sophia-Antipolis Cedex, France, vol. RAN WG1, No. e-Meeting, May 25, 2020-Jun. 5, 2020, May 16, 2020 (May 16, 2020), XP051885408, pp. 1-13, Sections 1 and 2.3.

CMCC: "Discussions on UL SRS for Positioning Collision Rules", 3GPP TSG RAN WG1 #100, 3GPP Draft, R1-2000761, 3rd Generation Partnership Project (3GPP), Mobile Competence Centre, 650, Route Des Lucioles, F-06921 Sophia-Antipolis Cedex, France, vol. RAN WG1, No. e-Meeting, Feb. 24, 2020-Mar. 6, 2020, 3 Pages, Feb. 14, 2020 (Feb. 14, 2020), XP051853043, Sections 2-3.
Ericsson: "Outcome of email Thread [100e-NR-Pos-ULRS-02]", 3GPP Draft, R1-2001287, 3GPP TSG-RAN WG1 Meeting #100-e, 3rd Generation Partnership Project (3GPP), Mobile Competence Centre, 650, Route Des Lucioles, F-06921 Sophia-Antipolis Cedex, France, vol. RAN WG1, No. Online, Feb. 24, 2020-Mar. 6, 2020, Feb. 29, 2020 (Feb. 29, 2020), XP051857250, pp. 1-11, sections 2.1-3.
Huawei, et al., "Finalizing SRS for NR Positioning", 3GPP Draft, R1-2003522, 3GPP TSG RAN WG1 Meeting #101-e , 3rd Generation Partnership Project (3GPP), Mobile Competence Centre, 650, Route Des Lucioles, F-06921 Sophia-Antipolis Cedex, France, vol. RAN WG1, No. E-meeting, May 25, 2020-Jun. 5, 2020, May 16, 2020 (May 16, 2020), XP051885306, 12 Pages, Sections 2-5.
International Search Report and Written Opinion—PCT/US2021/043698—ISA/EPO—Nov. 12, 2021.
VIVO: "Discussion on Remaining Issues on UL RS for NR Positioning", 3GPP Draft, R1-2000342, 3GPP TSG RAN WG1 #100, 3rd Generation Partnership Project (3GPP), Mobile Competence Centre, 650, Route Des Lucioles, F-06921 Sophia-Antipolis Cedex, France, vol. RAN WG1, No. e-Meeting, Feb. 24, 2020-Mar. 6, 2020, Feb. 15, 2020 (Feb. 15, 2020), XP051853245, 8 Pages, sections 2.1-2.4.

* cited by examiner

Identifying an expected collision of a positioning session and a radio communication session — 1210

Determining a priority between the positioning session and the radio communication session — 1220

Performing at least one of the positioning session or the radio communication session in accordance with the priority — 1230

METHOD AND APPARATUS FOR PRIORITIZATION BETWEEN POSITION SERVICES AND RADIO COMMUNICATION SERVICES

CROSS-REFERENCE TO RELATED APPLICATIONS

This application is the National Stage of International Application No. PCT/US2021/043698, filed Jul. 29, 2021, entitled "METHOD AND APPARATUS FOR PRIORITI-ZATION BETWEEN POSITION SERVICES AND RADIO COMMUNICATION SERVICES," which claims the benefit of Indian Patent Application number 202041032841, filed Jul. 31, 2020, entitled "MODEM-DEPENDENT PROCE-DURE PRIORITIZATION," both of which are assigned to the assignee hereof, and the entire contents of both of which are hereby incorporated herein by reference for all purposes.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Divi-sion Multiple Access (CDMA), Frequency Division Mul-tiple Access (FDMA), Orthogonal Frequency Division Mul-tiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G stan-dard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous con-nections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

In an embodiment, a user equipment includes: a receiver; a memory; and a processor, communicatively coupled to the receiver and the memory, configured to: identify an expected collision of a positioning session and a radio communication session; determine a priority between the positioning session and the radio communication session; and perform at least one of the positioning session or the radio communication session in accordance with the priority.

In another embodiment, a method, of prioritized perfor-mance of at least one of a positioning session or a radio communication session at a user equipment, includes: identifying an expected collision of the positioning session and the radio communication session; determining a priority between the positioning session and the radio communica-tion session; and performing at least one of the positioning session or the radio communication session in accordance with the priority.

In another embodiment, a user equipment includes: means for identifying an expected collision of a positioning session and a radio communication session; means for determining a priority between the positioning session and the radio communication session; and means for performing at least one of the positioning session or the radio communication session in accordance with the priority.

In another embodiment, a non-transitory, processor-read-able storage medium includes processor-readable instruc-tions to cause a processor, in order to prioritize performance of at least one of a positioning session or a radio commu-nication session at a user equipment, to: identify an expected collision of the positioning session and the radio commu-nication session; determine a priority between the position-ing session and the radio communication session; and per-form at least one of the positioning session or the radio communication session in accordance with the priority.

DETAILED DESCRIPTION

Figure 1:
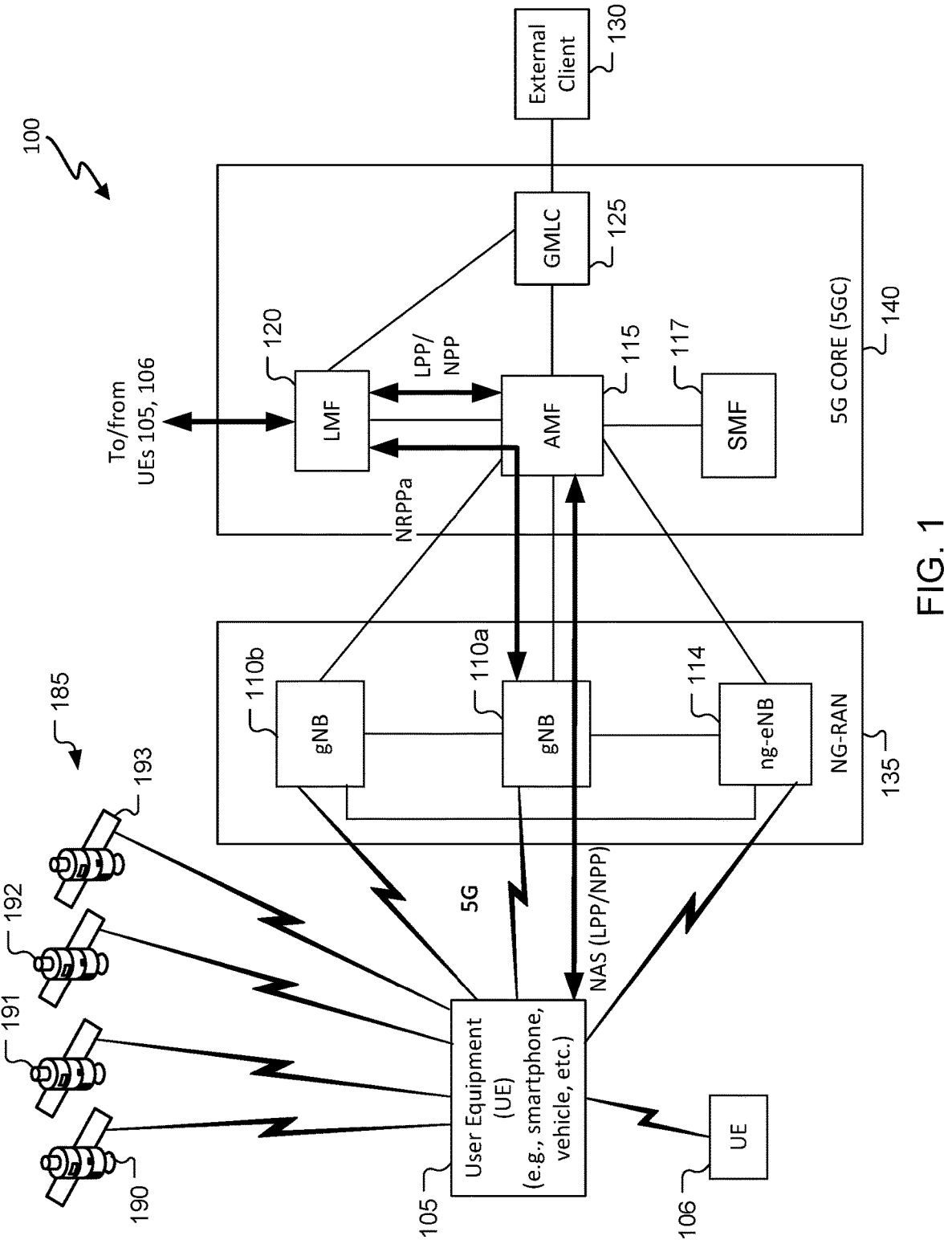
FIG. 1 is a simplified diagram of an example wireless communications system.

Techniques are discussed herein for prioritizing positioning relative to other modem-dependent operations. For example, a radio communication may be received or planned to be transmitted by a UE (user equipment) and a positioning signal may be received or planned to be transmitted by the UE. The UE may determine which of the radio communication or the positioning signal to receive/transmit and/or to process based on a priority of positioning and radio communication. The priority may depend on one or more of a combination of factors such as scheduled measurement gaps, positioning technique to be used for the positioning signal, whether position information is scheduled for periodic reporting, etc. One or more lower-priority operations may be ignored or delayed. For example, an incoming signal may not be measured or decoded during higher-priority processing and/or an outgoing signal may not be produced or sent during higher-priority processing. Other examples, however, may be implemented.

Items and/or techniques described herein may provide one or more of the following capabilities, as well as other capabilities not mentioned. Quality of service criteria may be better met. Urgent requests for information, e.g., position information, may be satisfied. Position information may be determined and reported with one or more desired criteria without preventing performance of other radio communication procedures. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others)

that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN) 135, here a Fifth Generation (5G) Next Generation (NG) RAN (NG-RAN), and a 5G Core Network (5GC) 140. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. The BSs 110a, 110b, 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more of the BSs 110a, 110b, 114 may be configured to communicate with the UE 105 via multiple carriers. Each of the BSs 110a, 110b, 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although only one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the BSs 110a, 110b, 114 and/or the network 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples only as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the BSs 110a, 110b, 114, the core network 140, and/or the external client 130. For example, such other devices may include internet of thing (IoT)

devices, medical devices, home entertainment and/or automation devices, etc. The core network 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The BSs 110a, 110b, 114 may each comprise one or more TRPs. For example, each sector within a cell of a BS may comprise a TRP, although multiple TRPs may share one or more components (e.g., share a processor but have separate antennas). The system 100 may include only macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the BSs 110a, 110b, 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120). The AMF 115 may serve as a control node that processes signaling between the UE 105 and the core network 140, and may provide QoS (Quality of Service) flow and session management. The AMF 115 may support mobility of the UE 105 including cell change and handover and may participate in supporting signaling connection to the UE 105.

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though only one of these connections may be supported by the 5GC 140 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS transmissions from the gNBs 110*a*, 110*b*, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-U IRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110*a*, 110*b*, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110*a*, 110*b*, and/or the ng-eNB 114) that are within range of the UE whose position is to be determined (e.g., the UE 105 of FIG. 1). The UE may, in some instances, use the directional SS beams from a plurality of base stations (such as the gNBs 110*a*, 110*b*, the ng-eNB 114, etc.) to compute the UE's position.

Figure 2:
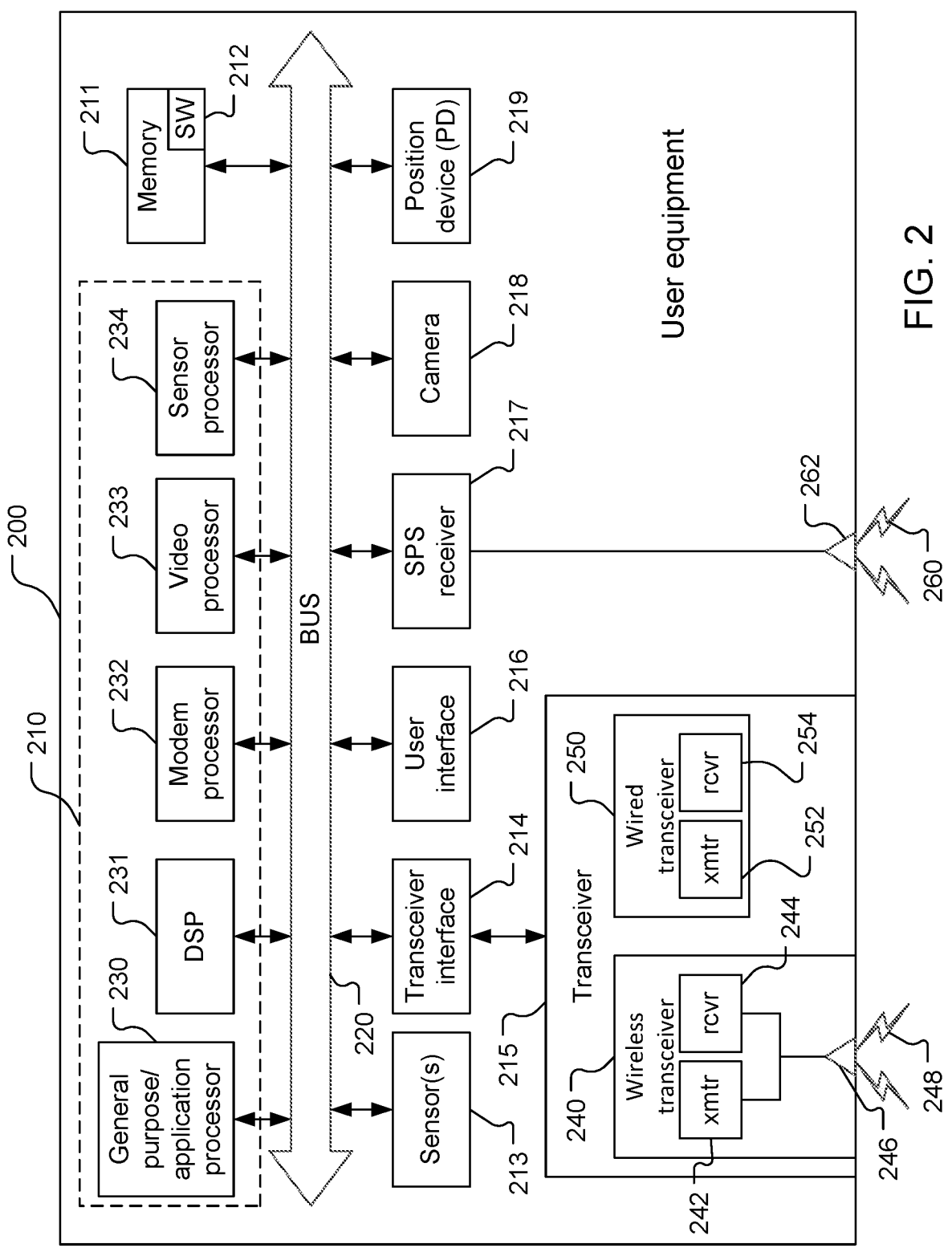
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identity, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer only to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the wireless transmitter 242 may include multiple transmitters that may be discrete components or combined/integrated components, and/or the wireless receiver 244 may include multiple receivers that may be discrete components or combined/ integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the network 135 to send communications to, and receive communications from, the network 135. The wired transmitter 252 may include multiple transmitters that may be discrete components or combined/integrated components, and/or the wired receiver 254 may include multiple receivers that may be discrete components or combined/ integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless SPS signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer only to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general purpose/application processor 230, the transceiver 215, the SPS receiver 217, and/or another component of the UE 200, and may be provided by hardware, software, firmware, or various combinations thereof.

Figure 3:
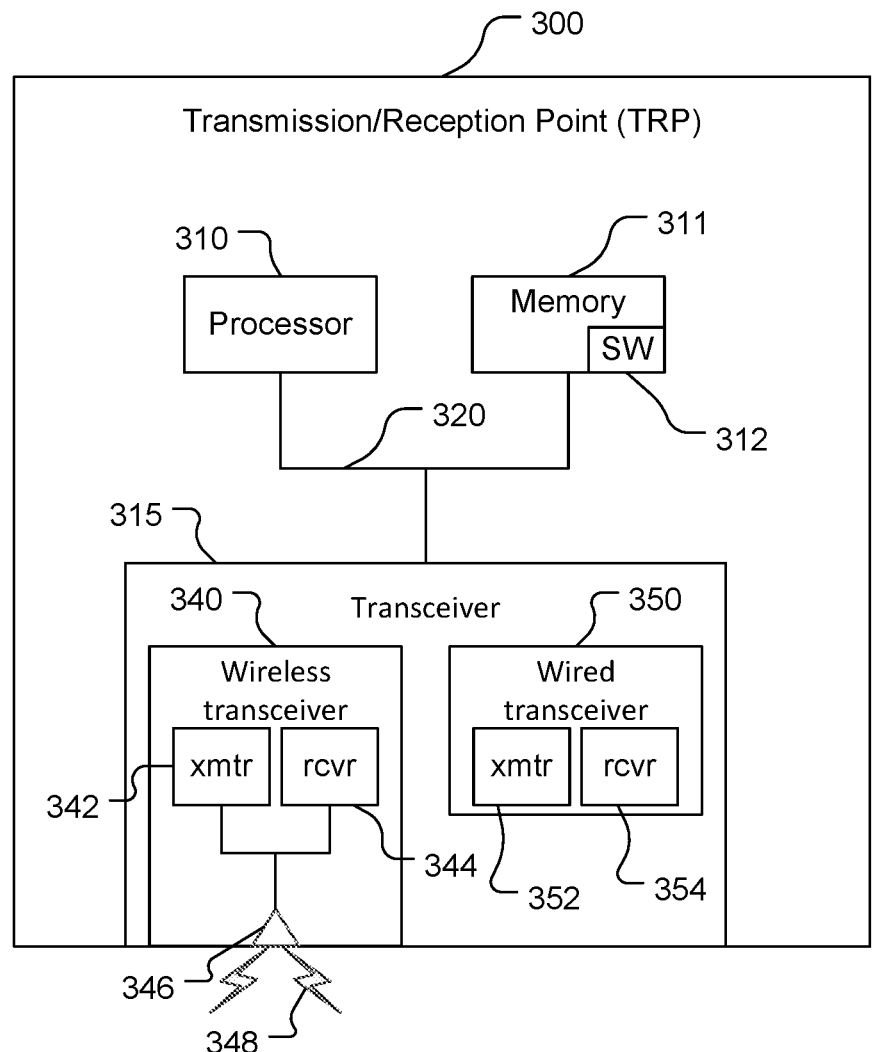
FIG. 3 is a block diagram of components of an example transmission/reception point.

Referring also to FIG. 3, an example of a TRP 300 of the BSs 110a, 110b, 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer only to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the BSs 110*a*, 110*b*, 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the network 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
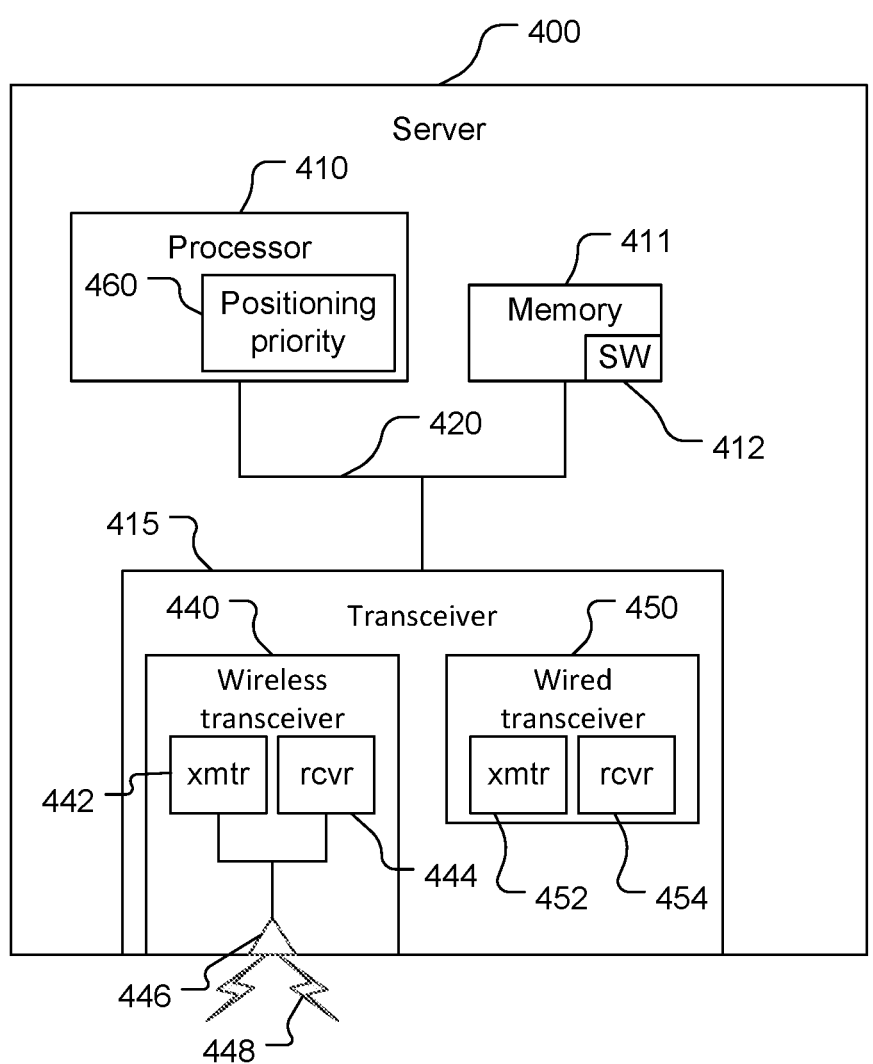
FIG. 4 is a block diagram of components of an example server, various embodiments of which are shown in FIG. 1.

Referring also to FIG. 4, a server 400, of which the LMF 120 is an example, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer only to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the network 135 to send communications to, and receive communications from, the TRP 300, for example, and/or one or more other entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Positioning Techniques

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that only the UEs subscribed to the service can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or war-driving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \rightarrow Tx}$ (i.e., UE $T_{Rx-Tx}$ or $UE_{Rx-Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \rightarrow Rx}$ between the transmission time of the RTT measurement signal from the base station and the ToA of the RTT response at the base station to the UE-reported time difference $T_{Rx \rightarrow Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message (s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS), may refer to one reference signal or more than one reference signal.

Positioning reference signals (PRS) include downlink PRS (DL PRS, often referred to simply as PRS) and uplink PRS (UL PRS) (which may be called SRS (Sounding Reference Signal) for positioning). A PRS may comprise a PN code (pseudorandom number code) or be generated using a PN code (e.g., scrambling a PN code with another signal) such that a source of the PRS may serve as a pseudo-satellite (a pseudolite). The PN code may be unique to the PRS source (at least within a specified area such that identical PRS from different PRS sources do not overlap). PRS may comprise PRS resources or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-PositioningFrequencyLayer, DL-PRS-Resource-Set, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element). A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource (or simply resource), can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple Resource Elements (REs) that may be in multiple Resource Blocks (RBs) within N (one or more) consecutive symbol(s) within a slot. An RB is a collection of REs spanning a quantity of one or more consecutive symbols in the time domain and a quantity (12 for a 5G RB) of consecutive subcarriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Stitching comprises combining PRS measurements over individual bandwidth fragments into a unified piece such that the stitched PRS may be treated as having been taken from a single measurement. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning signals being sent by UEs, and with PRS and SRS for positioning signals being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Downlink PRS Processing

Due to potential complexity (especially relative to LTE) and volume of positioning signals, limitations may be placed on positioning signals to limit PRS processing (including data buffering). For example, for NR, each TRP may have multiple beams and thus multiple PRS resources. For example, each TRP may configure up to 64 beams and thus up to 64 PRS resources for FR2 (Frequency Range 2 that is a mm-wave band from 24.25 GHz to 52.6 GHz) and up to 8 PRS resources for FR1 (Frequency Range 1 from 410 MHz to 7.125 GHz). A Fast Fourier Transform (FFT) size used for NR may be 4K, which is twice the FFT size used for LTE. Further, there may be up to 12 symbols per slot with a repetition of 32 slots (with each slot being possibly eight times smaller than an LTE subframe). Thus, the NR PRS may be as much as 1,000 times more complex that LTE. Consequently, one or more limitations may be placed on various UE position-processing capabilities to constrain the complexity and facilitate PRS processing (e.g., reduce processing including reducing data buffering) for positioning (e.g., processing of positioning signals in accordance with one or more positioning methods for determining position information (e.g., range (e.g., pseudorange), one or more PRS measurements, UE location, etc.)). For example, position-processing capabilities of a UE that may be designated include a maximum number of frequency layers (e.g., one or four), a maximum number of TRPs per frequency layer, a maximum number of PRS resource sets per TRP per frequency layer, a maximum number of PRS resources per PRS resource set, a maximum number of DL PRS resources per UE, a maximum number of TRPs for all frequency layers per UE, a maximum number of PRS resources per frequency layer, etc.

To facilitate PRS processing, e.g., to free up potential processing power for processing PRS, measurement gaps may be scheduled for a UE (although possibly only one measurement gap may be scheduled at a time). For example, a UE may request a measurement gap configuration so that the UE can measure DL PRS outside of an active DL BWP (BandWidth Part). A server, e.g., an LMF, may schedule one or more measurement gaps, e.g., in response to a request from the UE or independent of (e.g., in the absence of) any such request. The measurement gap, which may be requested by the UE, is a time during which the UE will not receive data or control information and thus not need to perform data or control processing. The UE may thus dedicate processing power during the measurement gap that would be used for data and/or control processing to positioning processing of PRS to determine position information. The position information may be a position (location) of the UE or other information (e.g., one or more ranges and/or one or more PRS measurements) that may be used for determining the position of the UE. With a measurement gap, the UE may measure the DL PRS outside of the active DL BWP or with a numerology different from that of the active DL BWP, with the numerology being the configuration of waveform parameters subcarrier spacing and cyclic prefix size. Without a measurement gap, if the UE measures DL PRS within an active DL BWP, then the UE will measure the DL PRS with the same numerology as the active BWP. Further, the UE will typically not be expected to process DL PRS in the same OFDM (Orthogonal Frequency Division Multiplexing) symbol where other DL signals and channels are transmitted to the UE, or to process DL PRS on any symbol indicated as uplink by the serving TRP.

Prioritization of Positioning and Radio Communications

Situations may arise where multiple uses may be desired concurrently for the same operational resources of a UE. For example, the same operational resources may be concurrently desired for receiving positioning signals and receiving or transmitting communication signals (e.g., data signals, reference signals (e.g., for channel state determination), sidelink communication signals, control signals, etc.). As another example, the same resources may be concurrently desired for use in processing a positioning signal (received or to be sent) and processing a communication signal (received or to be sent). The resources may be concurrently desired during a measurement gap or away from a measurement gap. In such cases of multiple concurrent desire for the same resources, a priority between positioning and radio communication may be used by the UE to determine which signal to receive/transmit and/or which signal to process (e.g., modulate/demodulate or encode/decode). The priority may depend on one or more of a variety of factors and may be determined by the UE or requested by the UE and determined and provided by another entity (e.g., a server such as an LMF) to the UE, as discussed further below.

Referring again to FIG. 4, the description herein may refer only to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function. The processor 410 (possibly in conjunction with the memory 411 and, as appropriate, the transceiver 415) includes a positioning priority unit 460. The positioning priority unit 460 may be configured to determine a priority between a positioning session (including positioning signal reception and/or positioning signal processing) and radio communication (including signal reception and/or signal transmission and/or signal processing). The positioning priority unit 460 may send an instruction to a UE, e.g., the UE 200, indicating the priority. The unit 460 may send the instruction to the UE 200 in response to a request from the UE 200. The unit 460 may determine the priority based on the request, e.g., to give higher priority to a positioning compared to a radio communication session. The instruction may guide the UE 200 to determine the priority based on one or more conditions. For example, the instruction may provide a conditional priority that depends on one or more measurement gaps scheduled for the UE 200 of which the UE 200 is aware but of which the server 400 may not be aware.

Figure 5:
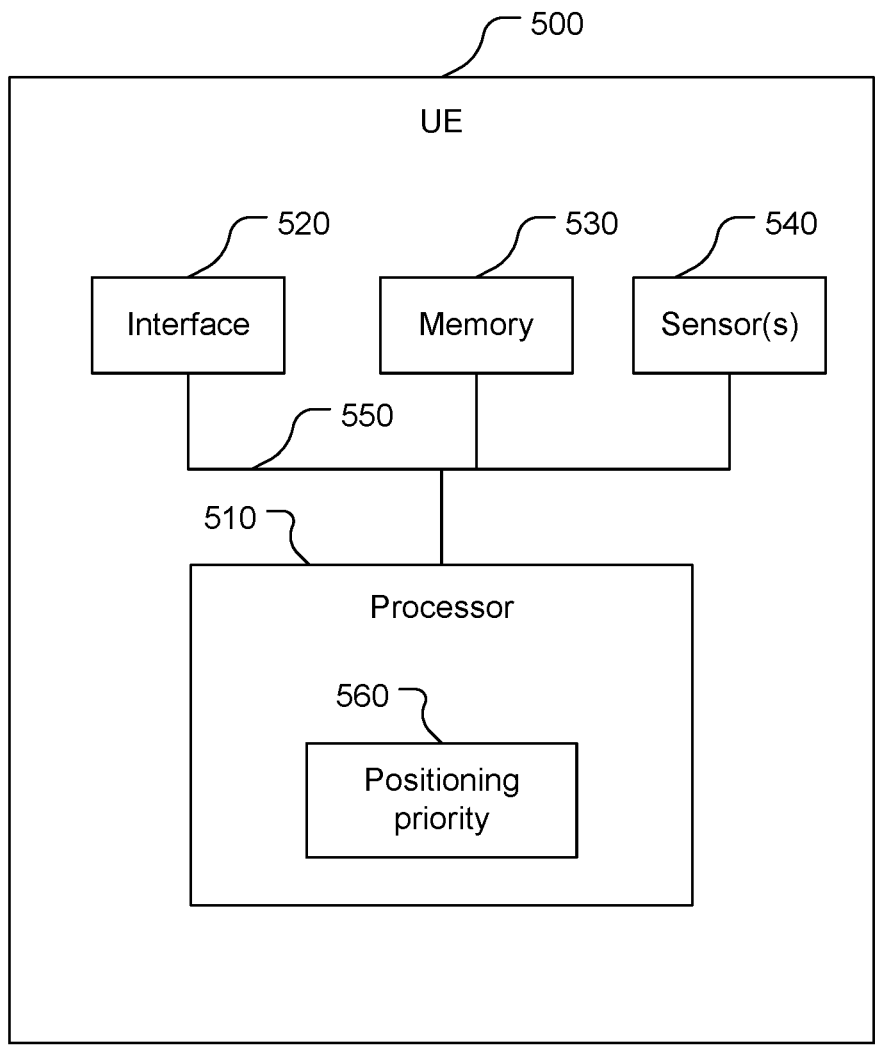
FIG. 5 is a simplified block diagram of an example user equipment.

Referring to FIG. 5, with further reference to FIGS. 1-4, a UE 500 includes a processor 510, an interface 520, a memory 530, and one or more sensors 540 communicatively coupled to each other by a bus 550. The UE 500 may include some or all of the components shown in FIG. 5, and may include one or more other components such as any of those shown in FIG. 2 such that the UE 200 may be an example of the UE 500. The processor 510 may include one or more components of the processor 210. The interface 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the interface 520 may include the wired transmitter 252 and/or the wired receiver 254. The interface 520 may include the SPS receiver 217 and the antenna 262. The memory 530 may be configured similarly to the memory 211, e.g., including software with processor-readable instructions configured to cause the processor 510 to perform functions. The sensor(s) 540 may include one or more of the sensor(s) 213 and/or may include the camera 218.

The description herein may refer only to the processor 510 performing a function, but this includes other implementations such as where the processor 510 executes software (stored in the memory 530) and/or firmware. The description herein may refer to the UE 500 performing a function as shorthand for one or more appropriate components (e.g., the processor 510 and the memory 530) of the UE 500 performing the function. The processor 510 (possibly in conjunction with the memory 530 and, as appropriate, the interface 520) includes positioning priority unit 560. The positioning priority unit 560 may be configured to determine a priority between a positioning session (including positioning signal reception and/or positioning signal processing) and radio communication (including signal reception and/or signal transmission and/or signal processing). Also or alternatively, the positioning priority unit 560 may be configured to send a request for positioning priority to another entity, e.g., the server 400, via the interface 520. The positioning priority unit 560 may determine the priority based on an instruction received via the interface 520 in response to the request, e.g., to give higher priority to a positioning session relative to a radio communication session.

Figure 6:
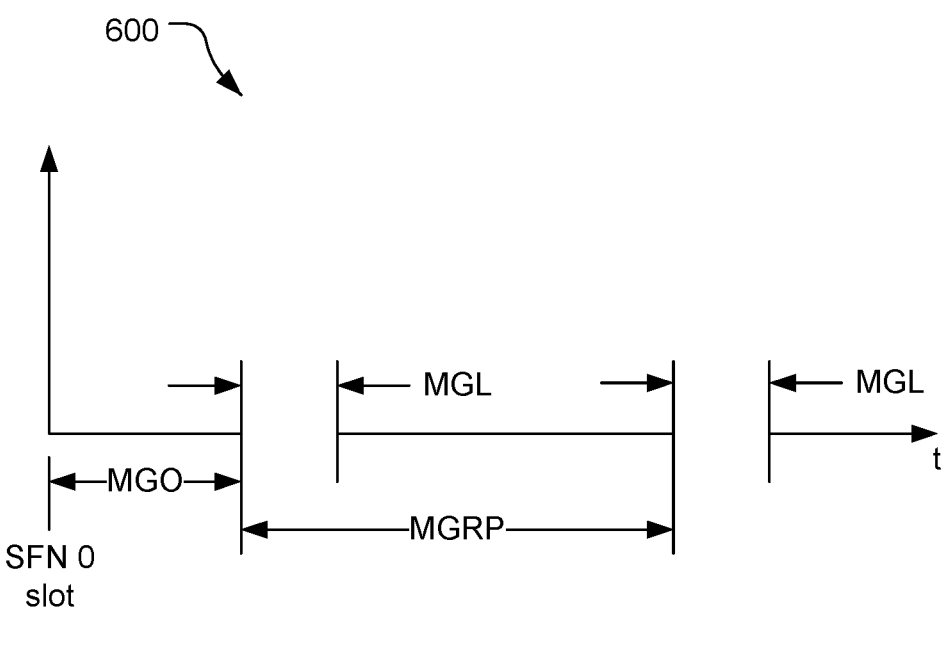
FIG. 6 is a simplified timing diagram of measurement gaps.

Referring also to FIG. 6, a timing diagram 600 of scheduled measurement gaps is shown. The measurement gaps are specified by a measurement gap offset (MGO), a measurement gap length (MGL), and a measurement gap repetition period (MGRP). The MGO is the offset of the measurement gap pattern in a number of slots from a reference slot, e.g., SFN slot 0 (System Frame Number slot 0). The MGO value points to a starting subframe within a period. There are numerous possible offset values, although not all offset values may be applicable for all periodicities. The range of values for MGO may be from 0 to MGRP-1. For example, if the periodicity is 20 ms, the offset ranges from 0 to 19. The MGL is the length of the measurement gap, e.g., in ms. Example measurement gap length magnitudes include 1.5, 3, 3.5, 4, 5.5, 6, 10, 18, 20, 34, 40, and 50 (or more). The MGRP defines the periodicity (e.g., in ms) at which the measurement gap repeats (if at all). Example magnitudes of the MGRP include 20, 40, 80, 160, 320, and 640. To measure a signal, the UE tunes to a target frequency to perform the measurement, and tunes back to a source frequency after the measurement (e.g., after the measurement gap ends). A measurement gap timing advance (MGTA) may also be provided that indicates an amount of time (e.g., in ms) in advance of a measurement gap subframe that the UE begins to tune to an appropriate frequency such that the UE is able to receive a signal when the measurement gap begins. The MGTA may be referred to as the tune-in or tune-out time. Example values of the MGTA include 0.25 ms (e.g., for FR2) or 0.5 ms (e.g., for FR1).

Figure 7:
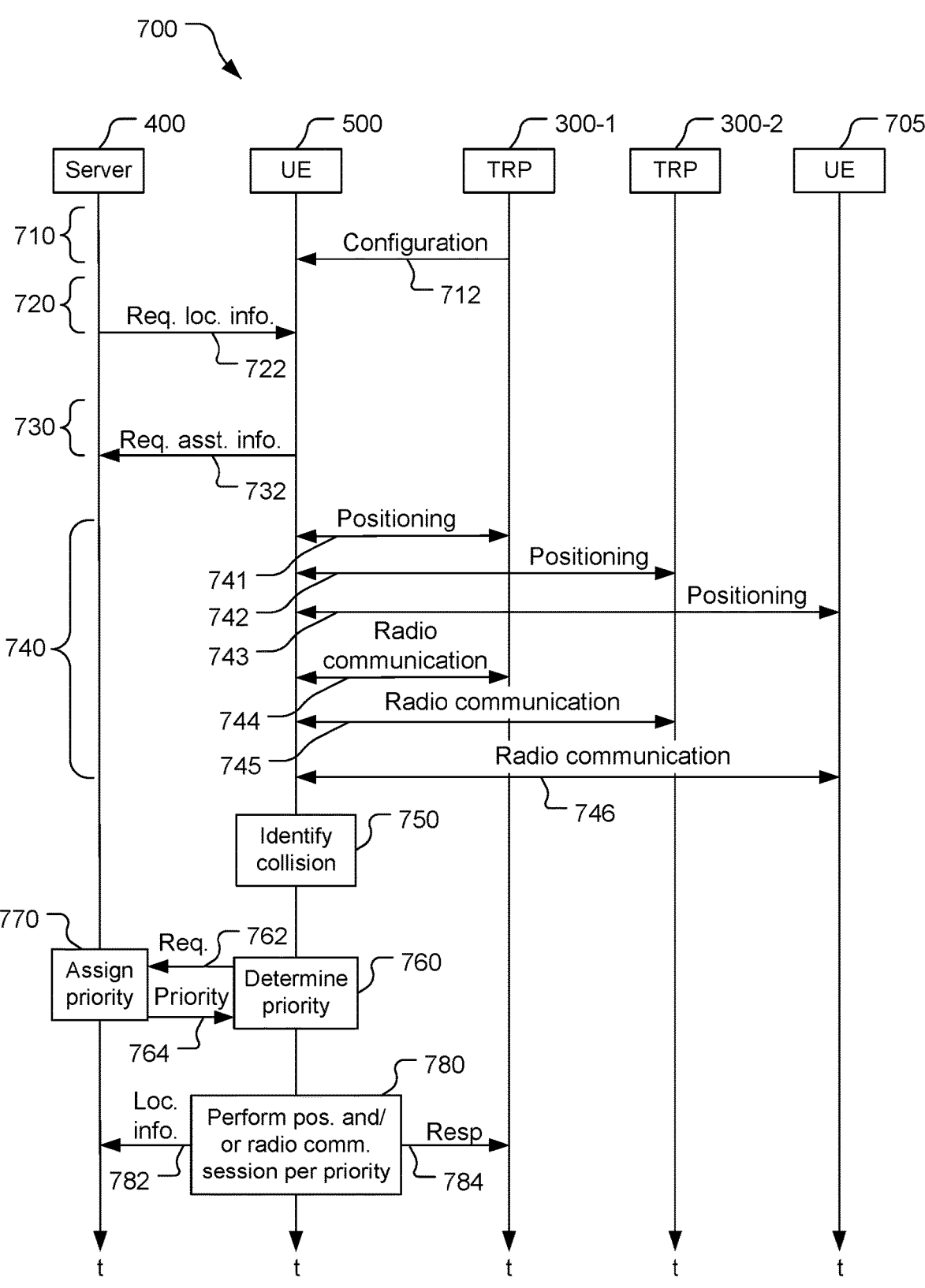
FIG. 7 is a simplified diagram of a process and signaling flow for prioritizing performance of positioning and radio communication sessions.

Referring also to FIG. 7, a signaling and process flow 700 for prioritizing performance of positioning and radio communication sessions includes the stages shown. The flow 700 may be altered, e.g., by having stages added, removed, rearranged, performed concurrently, etc. For example, stages 760 and 770 may be performed before stage 750 (or even before stage 710). As another example, stage 770 may not be performed.

At stage 710, a TRP 300-1, which is the serving TRP for the UE 500, sends a configuration message 712 to the UE 500. The configuration message 712 may configure the UE 500 to receive reference signals such as PRS, may schedule one or more measurement gaps (e.g., providing MGO, MGL, MGRP, and MGTA), and may configure one or more other features.

At stage 720, the server 400 sends a request location information message 722 to the UE 500. The message 722 may be an LPP message and may comprise a CommonIEs-RequestLocationInformation message body that carries common IEs (information elements), i.e., IEs that are the same for different location request types. The CommonIEs-RequestLocationInformation message body may be defined as follows.

```
CommonIEsRequestLocationInformation ::= SEQUENCE {
    locationInformationType  LocationInformationType,
    triggeredReporting       TriggeredReportingCriteria  OPTIONAL,  -- Cond ECID
    periodicalReporting      PeriodicalReportingCriteria OPTIONAL,  -- Need ON
    additionalInformation    AdditionalInformation       OPTIONAL,  -- Need ON
    qos                      QoS                         OPTIONAL,  -- Need ON
    environment              Environment                 OPTIONAL,  -- Need ON
    locationCoordinateTypes  LocationCoordinateTypes     OPTIONAL,  -- Need ON
    velocity Types           VelocityTypes               OPTIONAL,  -- Need ON
    ...,
    [[
    messageSizeLimitNB-r14   MessageSizeLimitNB-r14      OPTIONAL   -- Need ON
    ]],
    [[
        segmentationInfo-r14 SegmentationInfo-r14        OPTIONAL   -- Need ON
    ]]
}
```

The Quality of Service (QoS) IE may be defined as follows.

```
QoS ::= SEQUENCE {
    horizontalAccuracy          HorizontalAccuracy       OPTIONAL,  -- Need ON
    verticalCoordinateRequest   BOOLEAN,
    verticalAccuracy            VerticalAccuracy         OPTIONAL,  -- Need ON
    responseTime                ResponseTime             OPTIONAL,  -- Need ON
    velocityRequest             BOOLEAN,
    ...,
    [[ responseTimeNB-r14       ResponseTimeNB-r14       OPTIONAL   -- Need ON
    ]],
    [[ horizontalAccuracyExt-r15 HorizontalAccuracyExt-r15 OPTIONAL, -- Need ON
       verticalAccuracyExt-r15  VerticalAccuracyExt-r15  OPTIONAL   -- Need ON
    ]]
}
```

The QoS IE indicates the quality of service and may comprise a number of sub-fields. In the case of measurements, some of the sub-fields may apply to the location estimate that could be obtained by a server from the measurements provided by the UE 500, e.g., assuming that the measurements are the only sources of error. Fields of the QoS IE may be defined as follows, although the following is an example and not limiting of the disclosure (including the claims).

horizontalAccuracy indicates the maximum horizontal error in the location estimate at an indicated confidence level. The accuracy corresponds to the encoded uncertainty as defined in 3GPP TS 23.032 [15] and confidence corresponds to confidence as defined in 3GPP TS 23.032 [15].

verticalCoordinateRequest indicates whether a vertical coordinate is required (TRUE) or not (FALSE)

verticalAccuracy indicates the maximum vertical error in the location estimate at an indicated confidence level and is applicable when a vertical coordinate is requested. The accuracy corresponds to the encoded uncertainty altitude as defined in 3GPP TS 23.032 [15] and confidence corresponds to confidence as defined in 3GPP TS 23.032 [15].

responseTime responseTime indicates the maximum response time as measured between receipt of the RequestLocation-Information and transmission of a ProvideLocation- Information. If the unit field is absent, then the maximum response time is given as an integer number of seconds between 1 and 128. If the unit field is present, then the maximum response time is given in units of 10-seconds, between 10 and 1280 seconds. If the periodicalReporting IE is included in Com-monIEsRequestLocationInformation, then this field should not be included by the location server and should be ignored by the target device (if included).

responseTimeEarlyFix indicates the maximum response time as measured between receipt of the RequestLocationInformation and transmission of a ProvideLocationInformation containing early location measurements or an early location estimate. If the unit field is absent, then the maximum response time is given as an integer number of seconds between 1 and 128. If the unit field is present, then the maximum response time is given in units of 10-seconds, between 10 and 1280 seconds. When this IE is included, a target should send a ProvideLocationInformation (or more than one ProvideLocationInformation if location information will not fit into a single message) containing early location information according to the responseTimeEarlyFix IE and a subsequent ProvideLocationInformation (or more than one ProvideLocationInformation if location information will not fit into a single message) containing final location information according to the time IE. A target should omit sending a ProvideLocationInformation if the early location information is not available at the expiration of the time value in the responseTimeEarlyFix IE. A server should set the responseTimeEarlyFix IE to a value less than that for the time IE. A target should ignore the responseTimeEarlyFix IE if the value of the responseTimeEarlyFix IE is not less than that for the time IE.

unit indicates the unit of the time and responseTimeEarlyFix fields. Enumerated value 'ten-seconds' corresponds to a resolution of 10 seconds. If this field is absent, then the unit/resolution is 1 second.

velocityRequest indicates whether velocity (or measurements related to velocity) is requested (TRUE) or not (FALSE).

responseTimeNB

If the periodicalReporting IE or responseTime IE is included in CommonIEsRequestLocationInformation, then this field should not be included by the location server and should be ignored by the target device (if included).

timeNB indicates the maximum response time as measured between receipt of the RequestLocationInformation and transmission of a ProvideLocationInformation. If the unit field is absent, then the maximum response time is given as an integer number of seconds between 1 and 512. If the unit field is present, then the maximum response time is given in units of 10-seconds, between 10 and 5120 seconds.

responseTimeEarlyFixNB indicates the maximum response time as measured between receipt of the RequestLocationInformation and transmission of a ProvideLocationInformation containing early location measurements or an early location estimate. If the unit field is absent, then the maximum response time is given as an integer number of seconds between 1 and 512. If the unit field is present, then the maximum response time is given in units of 10-seconds, between 10 and 5120 seconds. When this IE is included, a target should send a ProvideLocationInformation (or more than one ProvideLocationInformation if location information will not fit into a single message) containing early location information according to the responseTimeEarlyFixNB IE and a subsequent ProvideLocationInformation (or more than one ProvideLocationInformation if location information will not fit into a single message) containing final location information according to the timeNB IE. A target should omit sending a ProvideLocationInformation if the early location information is not available at the expiration of the time value in the responseTimeEarlyFixNB IE. A server should set the responseTimeEarlyFixNB IE to a value less than that for the timeNB IE. A target should ignore the responseTimeEarlyFixNB IE if the value of the responseTimeEarlyFixNB IE is not less than that for the timeNB IE.

unitNB indicates the unit of the timeNB and responseTimeEarlyFixNB fields. Enumerated value 'ten-second' corresponds to a resolution of 10 seconds. If this field is absent, then the unit/resolution is 1 second.

horizontalAccuracyExt indicates the maximum horizontal error in the location estimate at an indicated confidence level. The accuracyExt corresponds to the encoded high accuracy uncertainty as defined in 3GPP TS 23.032 [15] and confidence corresponds to confidence as defined in 3GPP TS 23.032 [15]. This field should not be included by the location server and should be ignored by the target device if the horizontalAccuracy field is included in QoS.

verticalAccuracyExt indicates the maximum vertical error in the location estimate at an indicated confidence level and is only applicable when a vertical coordinate is requested. The accuracyExt corresponds to the encoded high accuracy uncertainty as defined in 3GPP TS 23.032 [15] and confidence corresponds to confidence as defined in 3GPP TS 23.032 [15]. This field should not be included by the location server and should be ignored by the target device if the verticalAccuracy field is included in QoS.

All QoS requirements should be obtained by the target device to the degree possible but a response that does not fulfill all QoS requirements may be permitted, e.g., if some requirements were not attainable. An exception is time and timeNB should always be fulfilled—even if that means not fulfilling other QoS requirements.

A target device supporting NB-IoT access should support the responseTimeNB IE.

A target device supporting HA GNSS should support the HorizontalAccuracyExt, VerticalAccuracyEx, and unit fields.

A target device supporting NB-IoT access and HA GNSS should support the unitNB field.

At stage 730, the UE 500 may send a request assistance information message 732 to request assistance data from the server 400. The assistance data may help the UE 500 acquire and/or measure one or more reference signals (e.g., PRS) and/or help the UE 500 process one or more measured reference signals. Assistance data may include different IEs for different positioning techniques and/or common IEs that are the same for different positioning techniques. For example, the message 732 may include a RequestAssistanceData message body defined as follows (although this is an example and not limiting of the disclosure, including the claims).

```
RequestAssistanceData-r9-IEs ::= SEQUENCE {
    commonIEsRequestAssistanceData   CommonIEsRequestAssistanceData   OPTIONAL,
    a-gnss-RequestAssistanceData     A-GNSS-RequestAssistanceData     OPTIONAL,
    otdoa-RequestAssistanceData      OTDOA-RequestAssistanceData      OPTIONAL,
    epdu-RequestAssistanceData       EPDU-Sequence                    OPTIONAL,
    ...,
    [[ sensor-RequestAssistanceData-r14
                                     Sensor-RequestAssistanceData-r14 OPTIONAL,
       tbs-RequestAssistanceData-r14 TBS-RequestAssistanceData-r14    OPTIONAL,
       wlan-RequestAssistanceData-r14 WLAN-RequestAssistanceData-r14  OPTIONAL
    ]],
    [[ nr-Multi-RTT-RequestAssistanceData-r16 NR-Multi-RTT-RequestAssistanceData-r16
    OPTIONAL,
       nr-DL-AoD-RequestAssistanceData-r16   NR-DL-AoD-RequestAssistanceData-r16
    OPTIONAL,
```

-continued

```
    nr-DL-TDOA-RequestAssistanceData-r16 NR-DL-TDOA-RequestAssistanceData-r16
    OPTIONAL
    ]]
}
```

At stage 740, the UE 500 identifies one or more positioning signals to be received by and/or transmitted by the UE 500, identifies one or more radio communication signals to be received by and/or transmitted by the UE 500, and identifies corresponding processing time(s). For example, the UE 500 may identify scheduled DL PRS, SRS for positioning (UL PRS), and/or SL PRS to be received and/or transmitted between the UE 500 and the serving TRP 300-1, another TRP 300-2, or another UE 705, in positioning messages 741, 742, 743, respectively. The UE 500 may also identify received DL signals such as data signals, reference signals (e.g., CSIRS (Channel State Information Reference Signal)), or control signals (e.g., RRM (Radio Resource Management) signal(s) for handover), UL signals, and/or SL signals communicated (or to be communicated) between the UE 500 and the serving TRP 300-1, another TRP 300-2, or another UE 705, in positioning messages 744, 745, 746, respectively. The UE 500 may determine a processing time corresponding to each appropriate signal such that the UE 500 may identify positioning sessions and radio communication sessions. Each positioning session and/or radio communication session may include respective signal reception and signal processing, or respective signal processing and signal transmission. The UE 500 may determine positioning session timing (i.e., when the session will start and end, and thus including the duration of the session), and radio communication session timing.

At stage 750, the UE 500 identifies a potential collision of a positioning session and a radio communication session. For example, the positioning priority unit 560 may be configured to identify an overlap in time of a positioning session (signal reception/transmission and signal processing) and a radio communication session (signal reception/transmission and signal processing). The positioning priority unit 560 may be configured to identify that there is or will be concurrent demand for one or more resources for the positioning session and the radio communication session. Either session may involve reception of a signal followed by processing (e.g., demodulation and decoding) of the signal, or may involve processing (e.g., modulation and encoding) to produce a signal followed by transmission of the signal (e.g., a UL data transmission, transmission of an SRS for positioning, etc.). Both of the positioning session and the radio communication session use modulation and/or demodulation resources of the UE 500. A radio communication session may, for example, include signal reception (e.g., a DL data signal), and may also include processing of the received signal (e.g., HARQ (Hybrid Automatic Repeat Request)) and transmission of another signal (e.g., an ACK/NACK (acknowledge/no acknowledge) signal, a CSI report). The ACK/NACK may be separated in time from a received signal by several, e.g., 16 or 32, slots. A positioning session may, for example, include signal reception (e.g., PRS), processing of the received signal (e.g., measurement, position information (e.g., pseudorange, position estimate) determination), and transmission of another signal (report position information, SRS for positioning, etc.). To simplify examples, each positioning session or radio communication session discussed below includes (absent alteration due to prioritization) a signal reception, processing of the received signal, and transmission of a corresponding signal.

Figure 8A:
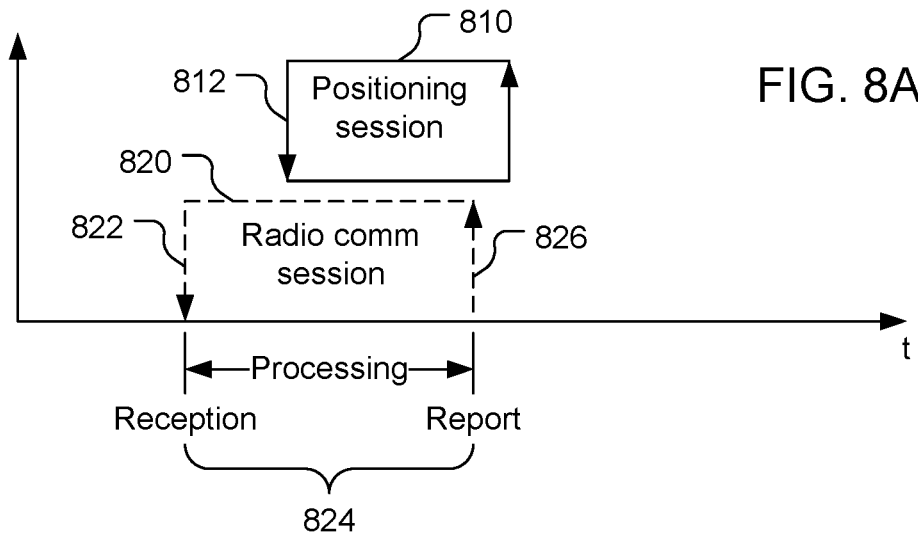
FIG. 8A is a simplified timing diagram of a positioning session beginning during a radio communication session and ending after the radio communication session.
Figure 9A:
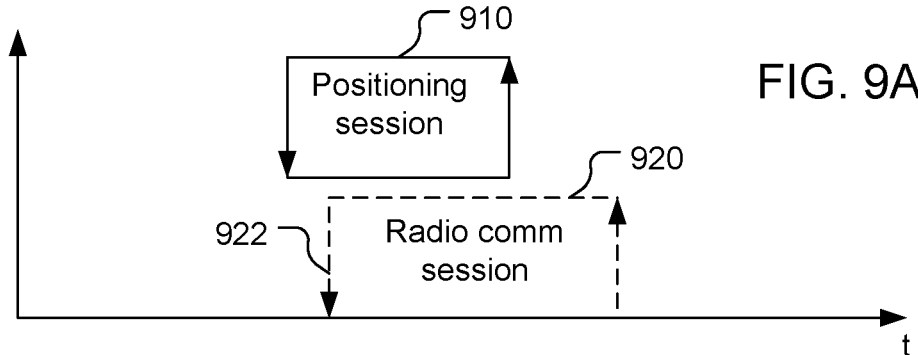
FIG. 9A is a simplified timing diagram of a positioning session beginning before a radio communication session and ending during the radio communication session.
Figure 10A:
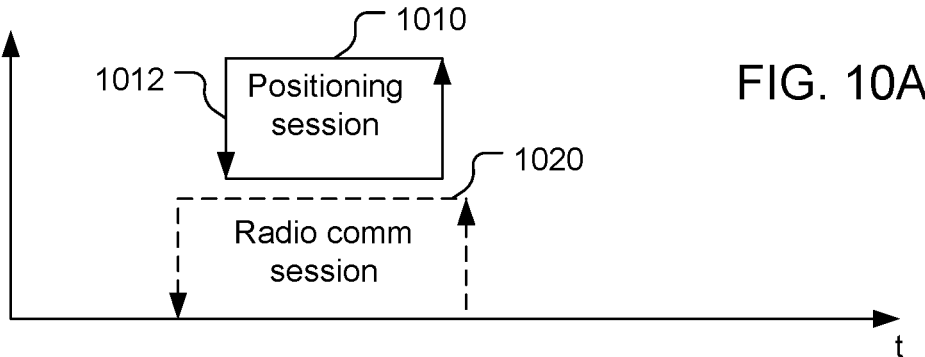
FIG. 10A is a simplified timing diagram of a positioning session beginning and ending during a radio communication session.
Figure 11A:
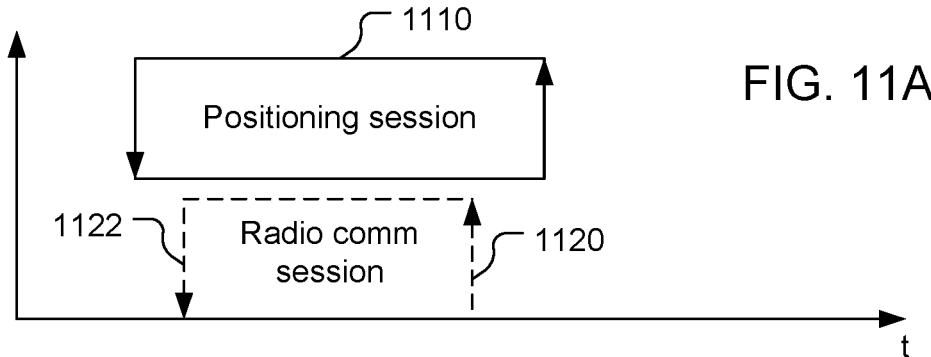
FIG. 11A is a simplified timing diagram of a positioning session beginning before, and ending after, a radio communication session.

The potential collision identified by the UE 500 may be of various configurations. For example, referring also to FIG. 8A, an expected positioning session 810 may begin after an expected radio communication session 820 and extend beyond the expected radio communication session 820. The positioning session 810 may be expected in that a positioning signal 812 may not yet have been received. The radio communication session 820 may be expected in that an inbound signal 822 (e.g., a DL data signal) may have been received and a processing duration 824 is expected to be used before sending a report 826 (e.g., at a scheduled time after reception of the inbound signal 822). In this case, the inbound signal 822 does not collide with the positioning session 810, but the radio communication session 820 (i.e., the signal processing portion of the radio communication session 820) collides with the positioning session 810. As another example, referring also to FIG. 9A, an expected positioning session 910 begins before an expected radio communication session 920 and ends during the expected radio communication session 920. As another example, referring also to FIG. 10A, an expected positioning session 1010 is entirely within a duration of an expected radio communication session 1020. As another example, referring also to FIG. 11A, an expected positioning session 1110 begins before an expected radio communication session 1120 and ends after the expected radio communication session 1120 (i.e., the radio communication session 1120 is entirely within the duration of the positioning session 1110).

At stage 760, the UE 500 (e.g., the positioning priority unit 560) determines priority between the positioning session and the radio communication session. The positioning priority unit 560 may determine the priority without instruction from the server 400. The positioning priority unit 560 may send a report to the server 400 indicating the determined priority that the UE 500 will implement (e.g., in a capabilities message). Alternatively, the positioning priority unit 560 may send a request 762 to the server 400 for priority information. For example, the positioning priority unit 560 may request higher priority for positioning in response to insufficient position information having been determined (e.g., a lack of position information determination, failure to meet one or more QoS parameters) and/or in response to a scheduled (e.g., periodic) position information report being imminently due. The UE 500 may request to change the priority or request a specific priority, e.g., of the positioning session over the radio communication session (e.g., an RRM procedure), over DL channels, etc. The request of priority may be part of the request assistance information message 732 (e.g., part of a RequestAssistanceData message body) or part of a location information message discussed further below. The request for priority may have an associated expiration, e.g., a timer that indicates an amount of time for which the UE 500 is requesting that priority will be in effect (barring a subsequent change in the priority). The UE 500 may request different priority levels based on one or more criteria, e.g., based on communication technology. For example, the UE 500 may request different priorities for cellular network positioning (Uu-positioning) and sidelink positioning (SL-positioning).

At stage 770, the server 400, e.g., the positioning priority unit 460, may assign a priority and send a priority assignment message 764 to the UE 500. The priority assignment message 764 may indicate which of a positioning session or a radio communication session has higher priority. The priority assignment message 764 may provide conditions that the UE 500 may use to determine the priority, e.g., based on one or more factors such as relative timing of the sessions, whether one or more measurement gaps are scheduled, whether a measurement gap is dedicated to positioning, a positioning technique to be implemented to determine position information (e.g., position estimate, pseudorange, PRS measurement, etc.). The priority assignment message 764 may be sent by the server 400 (e.g., an LMF) via the serving TRP 300-1 (e.g., through NRPPa) and/or to the UE 500 directly (e.g., using LPP). The priority may be provided to the TRP 300-1, e.g., so that the TRP 300-1 can anticipate performance of the UE 500, and thus determine any expected disruption in operation (e.g., signal processing).

The priority of the positioning session relative to the radio communication session may be determined by the UE 500 and/or the server 400 based on one or more factors. For example, the priority may be based on a positioning technique to be implemented to determine position information. The positioning session for some positioning techniques may result in a higher priority for the positioning session than for the radio communication session while other techniques may result in a lower priority for the positioning session than the radio communication session. The radio communication session may include signal reception without including signal processing. The priority may be determined/assigned based on the radio communication signal. For example, the priority may assign a higher priority to the positioning signal based on the radio communication session comprising reception of a PDCCH (Physical Downlink Control CHannel) signal, a PDSCH (Physical Downlink Shared CHannel) signal, or a CSIRS signal for CSI. The priority may also or alternatively be determined/assigned based on a radio communication signal processing procedure type. For example, the priority may be determined based on the procedure type being an RRM procedure (e.g., for handover of the UE 500), a DL data reception procedure (e.g., processing a PDSCH signal), a UL data transmission procedure (e.g., processing a PUSCH (Physical Uplink Shared CHannel) signal), a DL CSI procedure (processing CSIRS), a sidelink (SL) communication procedure, etc. The priority may assign a higher or lower priority of positioning relative to any of these procedures, and the priority may depend on one or more other factors. The priority may depend on a type of signal, e.g., a type of reference signal. For example, a different priority may be assigned for DL-PRS compared to UL SRS for positioning, e.g., with DL-PRS having higher priority than UL SRS for positioning. As another example, the priority may provide equal priority for DL-PRS and UL SRS for positioning in response to an RTT (e.g., multi-RTT) positioning technique being expected to be implemented (e.g., by the UE 500) to determine position information. The priority may have an associated expiration time. For example, the priority may be associated with a timer that begins upon assignment of the priority (e.g., determination by the UE 500 or receipt of the priority assignment message 764 by the UE 500). Upon expiration of the timer (e.g., after 100 ms), the priority is invalidated, e.g., ignored, and the priority may be returned to a default priority upon or changed to a new priority (e.g., as determined by the UE 500 or as indicated by another priority assignment message). The priority may be assigned based on whether a positioning session will use cellular network information exchange (e.g., Uu-positioning using a Uu link) or sidelink information exchange (SL-positioning). In SL-positioning, one or more reference signals are exchanged through one or more SL channels and spectrum for measurement. The priority may be a conditional priority. For example, positioning may have a conditionally higher priority than a radio communication session, e.g., having a higher priority unless the positioning is SL-positioning, in which case the positioning would have lower priority than the radio communication session.

The assignment or determination of the priority may be explicit. For example, the server 400 may explicitly assign the priority through the priority assignment message 764, through the request location information message 722, or through another message.

The assignment or determination of the priority may be implicit. For example, the priority may be implicitly determined based on measurement gap scheduling, response time for position information, one or more QoS parameters, whether position reporting is periodic, etc. For example, the positioning session may be given priority over the radio communication session (e.g., RRM procedure, e.g., for handover) based on a single measurement gap being scheduled, at least within a threshold amount of time. As another example, the radio communication session may be given higher priority than the positioning session based on multiple separate measurement gaps being scheduled. The priority may be based on whether one of multiple scheduled measurement gaps is dedicated to positioning. A measurement gap may be explicitly indicated as being dedicated to positioning, e.g., in a message from the serving TRP 300-1. A measurement gap may be implicitly indicated as being dedicated to positioning, e.g., by being longer than a measurement gap for non-positioning (e.g., for RRM). For example, a maximum measurement gap for RRM may be 6 ms and a measurement gap longer than 6 ms, e.g., 10 ms, may implicitly indicate that the measurement gap is dedicated for positioning. The positioning session may have lower priority than the radio communication session based on a measurement gap length being less than or equal to the maximum measurement gap length for RRM. As another example, positioning may have lower priority based on multiple MGs being scheduled, none of the MGs being longer than a maximum MGL for RRM, and none of the MGs being explicitly dedicated to positioning. As another example, there may be a default priority with multiple scheduled MGs. For example, positioning may have lower priority as a default based on multiple MGs being scheduled.

Also or alternatively, the priority may be implicitly determined based on one or more other factors. For example, the priority may be based on communication technology for positioning. For example, Uu-positioning may be given higher priority than SL-positioning based on the UE 500 being in coverage of the TRP 300-1, and SL-positioning may be given higher priority than Uu-positioning based on the UE 500 being out-of-coverage of the TRP 300-1 (or any other TRP 300) or in partial coverage (e.g., DL between the TRP 300-1 and the UE 500 is operational but UL is not). As another example, the priority may be based on whether position information reporting is periodic or single-shot reporting. For example, positioning may be given higher priority based on there being a single position report scheduled (implying that position is urgent). Positioning may be given a lower priority based on periodic position reporting being scheduled (such that position information may be eventually reported even if a position report is skipped).

Also or alternatively, the priority may be implicitly determined based on one or more quality of service parameters. For example, the priority may be based on one or more of horizontalAccuracy, verticalAccuracy, verticalCoordinateRequest, velocityRequest, response Time, timeNB, horizontalAccuracyExt, or verticalAccuracyExt. For example, the priority may depend on a response time for the UE 500 to provide position information. The priority may give positioning higher priority based on the response time being below a threshold amount of time. The response time may be included in the request location information message 722. The threshold may be a capability of the UE 500. The priority may be based on a type of QoS parameter being indicated, e.g., presence of verticalCoordinateRequest and/or presence of velocityRequest resulting in (or at least weighing in favor of) positioning having higher priority. The priority may favor the positioning session over the radio communication session if an indicated QoS accuracy exceeds a threshold.

The priority may be based on a combination of factors. For example, each of multiple factors may weigh in favor of higher positioning priority or lower positioning priority (always or based on a value of the factor). Weighing in favor of higher positioning priority may be assigned a value of 1 and weighing in favor of lower positioning priority may be assigned a value of 0. Each of the factors may have a corresponding weighting, e.g., a value between two numbers (e.g., 0 and 1). After weighting each factor, an average may be calculated and the priority determined based on the average and a threshold, e.g., with a positioning session being given higher priority than a radio communication session based on the weighted average exceeding the threshold and the positioning session being given lower priority than the radio communication session based on the weighted average not exceeding the threshold.

Figure 8B:
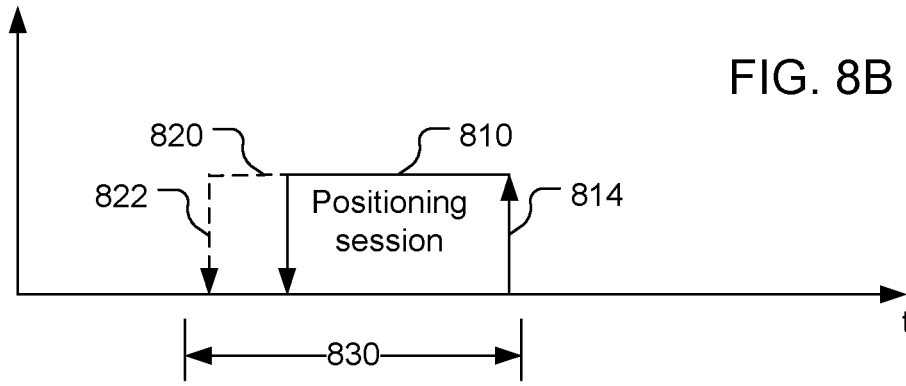
FIG. 8B is a simplified timing diagram of processing the positioning and radio communication sessions shown in FIG. 8A with positioning having higher priority.
Figure 8C:
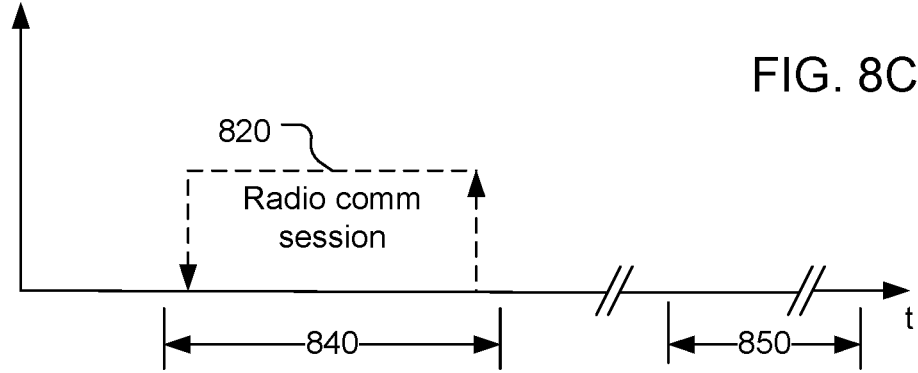
FIG. 8C is a simplified timing diagram of processing the positioning and radio communication sessions shown in FIG. 8A with positioning having lower priority.
Figure 9B:
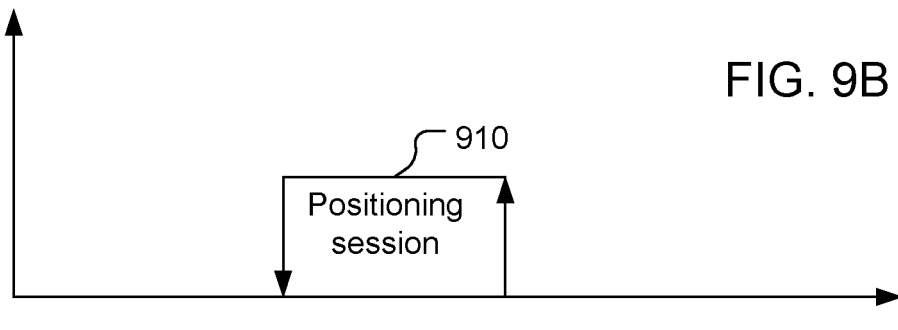
FIG. 9B is a simplified timing diagram of processing the positioning and radio communication sessions shown in FIG. 9A with positioning having higher priority.
Figure 9C:
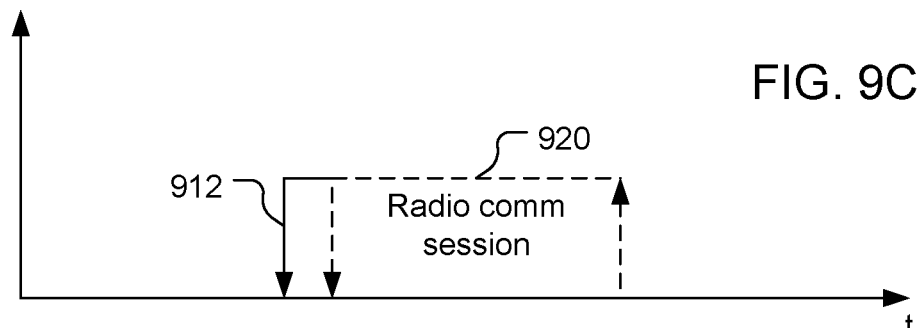
FIG. 9C is a simplified timing diagram of processing the positioning and radio communication sessions shown in FIG. 9A with positioning having lower priority.
Figure 10B:
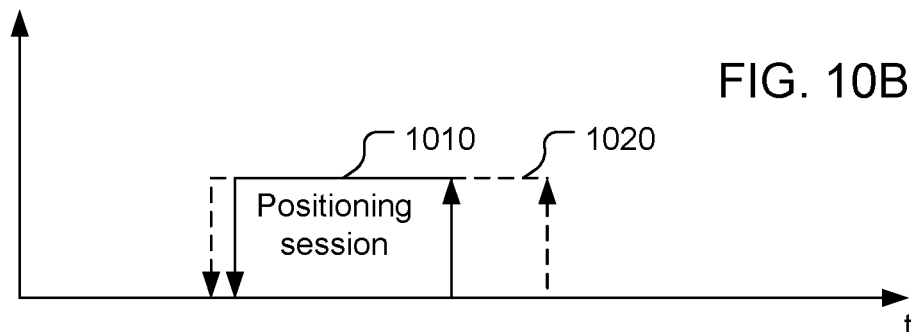
FIG. 10B is a simplified timing diagram of processing the positioning and radio communication sessions shown in FIG. 10A with positioning having higher priority.
Figure 10C:
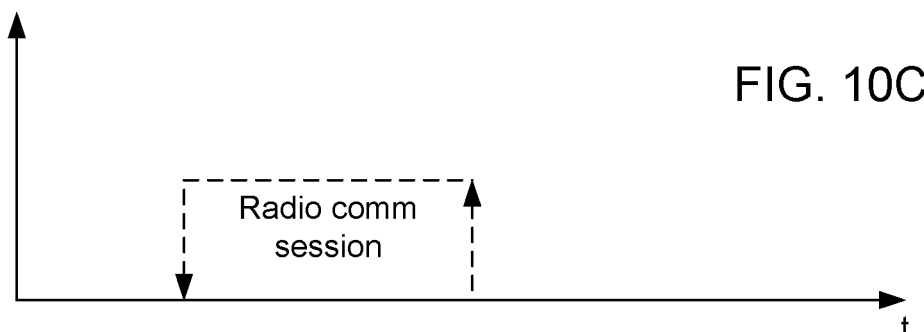
FIG. 10C is a simplified timing diagram of processing the positioning and radio communication sessions shown in FIG. 10A with positioning having lower priority.
Figure 11B:
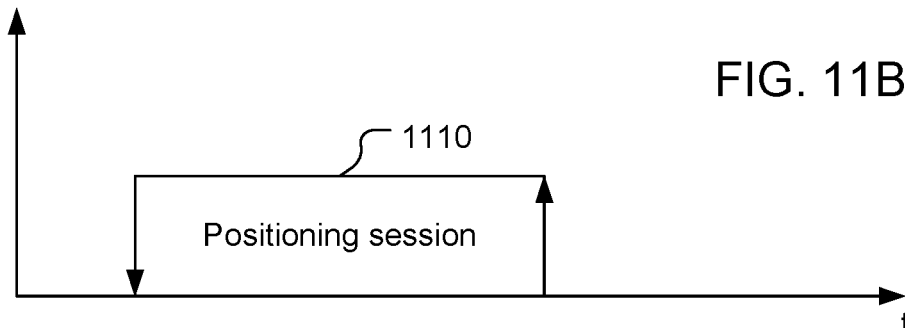
FIG. 11B is a simplified timing diagram of processing the positioning and radio communication sessions shown in FIG. 11A with positioning having higher priority.
Figure 11C:
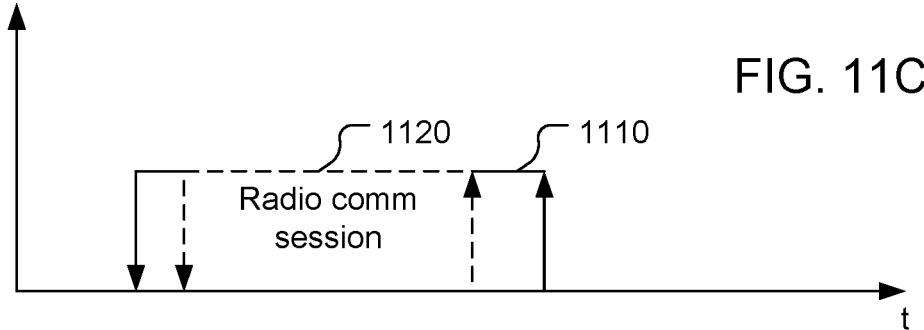
FIG. 11C is a simplified timing diagram of processing the positioning and radio communication sessions shown in FIG. 11A with positioning having lower priority.

At stage 780, the UE 500 performs the positioning session and/or the radio communication session in accordance with the determined priority. Based on the priority and the relative timing of the positioning session and the radio communication session, some or all of either session may not be performed. Referring also to FIGS. 8B, 8C, 9B, 9C, 10B, 10C, 11B, and 11C, performance of the positioning and radio communication session under the relative timings show in FIGS. 8A, 9A, 10A, and 11A are shown. In FIGS. 8B, 9B, 10B, and 11B, the positioning session has higher priority and in FIGS. 8C, 9C, 10C, and 11C, the radio communication session has higher priority. As shown in FIG. 8B, with the positioning session 810 starting after the radio communication session 820 and having priority over the radio communication session 820, the inbound signal 822 is received, and may be partially processed before the positioning session 810 begins. The processing of the inbound signal 822 may be discontinued at the beginning of the positioning session. The inbound signal 822 may be discarded or retained. The inbound signal 822 and any partial processing of the inbound signal 822 may be retained if the radio communication session 820 will be continued after completion of the positioning session 810. Here, the scheduled time of the report 826 is during the positioning session 810, and thus the UE 500 discards the inbound signal 822 and any partial processing of the inbound signal 822, does not send (or even determine) the report 826, and performs the positioning session 810, including sending a position information report 814. For example, the inbound signal 822 may be a PDSCH communication, but demodulation and decoding is delayed or even prevented from completing due to the positioning session, and the UE 500 may send a NACK response to the PDSCH. As another example, a DCI (Downlink Control Information) may be received that indicates a PUSCH communication for UL data transfer during the duration of the positioning session 810, and thus the UE may not send the PUSCH communication (at least at the scheduled time). As shown in FIG. 8C, with the radio communication session 820 having priority over the positioning session 810, and the positioning signal 812 scheduled to be received during the radio communication session 820, the UE 500 may ignore the positioning signal 812, perform the entirety of the radio communication session 820, and perform none of the positioning session 810. As shown in FIG. 9B, with the positioning session 910 having higher priority, the positioning session 910 is performed while the radio communication session 920 is ignored entirely. A DL signal 922 may not be received (e.g., decoded) as the DL signal 922 collides with the higher-priority positioning session 910. As shown in FIG. 9C, with the radio communication session 920 having priority over the positioning session, a PRS 912 may be received but positioning processing not completed, and instead resources directed to performance of the radio communication session 920. As shown in FIG. 10B, the positioning session 1010 is performed, but the radio communication session 1020, begun before the positioning session 1010, may also be completed after completion of the positioning session 1010, e.g., time permitting after completion of the positioning session 1010. In this example, the radio communication session 1020 is completed after the radio communication session 1020 would have completed absent the interruption for performing the positioning session 1010. As shown in FIG. 10C, the radio communication session 1020 is completely performed while the positioning session 1010 is ignored, with a positioning signal 1012 being ignored due to receipt during the higher-priority radio communication session 1020. As shown in FIG. 11B, the UE 500 performs the entire positioning session 1110 and ignores the radio communication session 1120 as the entire radio communication session 1120, and in particular an inbound signal 1122, reaches the UE 500 within the duration of the positioning session 1110. As shown in FIG. 11C, the radio communication session 1120 is performed, and the positioning session 1110, begun before the radio communication session 1120, may also be completed after completion of the radio communication session 1120, e.g., time permitting after completion of the radio communication session 1120. By processing the radio communication session and/or the positioning session in accordance with a priority based on one or more quality of service criteria, the one or more quality of service criteria may be better met and/or better assured of being met. By processing the radio communication session and/or the positioning session in accordance with a priority based on an urgent request and/or an imminent positioning reporting time, urgent position information requirements may be met. By processing both the radio communication session and the positioning session, time permitting, based on the priority may help meet one or more criteria (e.g., positioning latency, urgent communication completion, etc.) without preventing performance of either the radio communication session or the positioning session.

During stage 780, a location information message 782 and/or a response message 784 may be provided to the server 400 or the TRP 300-1, respectively. For example, the report 814 may be provided to the server 400 or the report

826 may be provided to the TRP 300-1. The location information message 782 may include a CommonIEsProvideLocation message body that includes common IEs for providing location information. The common IEs provide location that is the same (common) for different positioning techniques (e.g., OTDOA, RTT, etc.). The CommonIEsProvideLocation message body may be defined as follows (although this is an example and not limiting of the disclosure, including the claims).

```
CommonIEsProvideLocationInformation ::= SEQUENCE {
    locationEstimate        LocationCoordinates         OPTIONAL,
    velocityEstimate        Velocity                    OPTIONAL,
    locationError           LocationError               OPTIONAL,
    ...,
    [[ earlyFixReport-r12   EarlyFixReport-r12          OPTIONAL
    ]],
    [[ locationSource-r13   LocationSource-r13          OPTIONAL,
       locationTimestamp-r13 UTCTime                    OPTIONAL
    ]],
    [[
       segmentationInfo-r14  SegmentationInfo-r14  OPTIONAL    -- Cond Segmentation
    ]]
}
```

Figure 12:
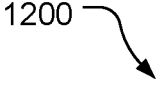
FIG. 12 is a block flow diagram of a method prioritized performance of at least one of a positioning session or a radio communication session.
Figure 12:
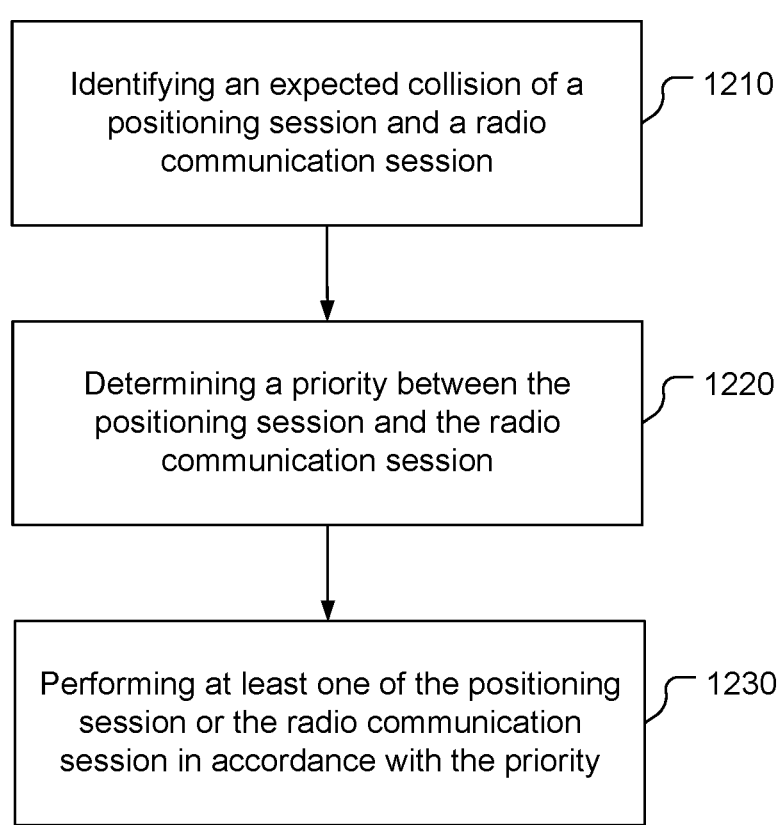

Referring to FIG. 12, with further reference to FIGS. 1-11, a method 1200 of prioritized performance of at least one of a positioning session or a radio communication session at a UE includes the stages shown. The method 1200 is, however, an example only and not limiting. The method 1200 may be altered, e.g., by having stages added, removed, rearranged, combined, performed concurrently, and/or having single stages split into multiple stages.

At stage 1210, the method includes identifying an expected collision of the positioning session and the radio communication session. For example, the UE 500 may identify one or more expected collisions at stage 750 discussed above. The processor 510, possibly in combination with the memory 530 (possibly in combination with the interface 520 (e.g., the wireless receiver 244 and the antenna 246)) 540 may comprise means for identifying an expected collision.

At stage 1220, the method 1200 includes determining a priority between the positioning session and the radio communication session. For example, the UE 500 may determine the relative priority of the positioning session and the radio communication session at stage 760 discussed above. The processor 510, possibly in combination with the memory 530 (possibly in combination with the interface 520 (e.g., the wireless receiver 244 and the antenna 246)) 540 may comprise means for determining the priority.

At stage 1230, the method 1200 includes performing at least one of the positioning session or the radio communication session in accordance with the priority. For example, the UE 500 may perform the positioning session and/or the radio communication session (e.g., all of one session and none of the other, all of one session and some of the other, or all of both session) at stage 780 discussed above. The processor 510, possibly in combination with the memory 530, in combination with the interface 520 (e.g., the wireless transmitter 242, the wireless receiver 244, and the antenna 246) may comprise means for performing at least one of the positioning session or the radio communication session in accordance with the priority.

Implementations of the method 1200 may include one or more of the following features. In an example implementation, determining the priority (by the UE 500 and/or the server 400) may be based on a positioning technique to be implemented by the UE in the positioning session (e.g., one positioning technique influencing the priority toward higher positioning priority and another technique influencing the priority toward lower positioning priority). In another example implementation, the priority may be determined, in response to the positioning technique being a technique that uses both downlink reference signals and uplink reference signals, such that equal priority relative to the radio com-munication session is given to downlink positioning reference signal handling and to uplink sounding reference signal for positioning handling. For example, based on the positioning technique being an RTT technique (e.g., multi-RTT), DL-PRS and UL SRS for positioning may be given equal priority for reception and/or processing. In another example implementation, the priority may be determined such that inequal priorities relative to the radio communication session are given to downlink positioning reference signal handling and to uplink sounding reference signal for positioning handling. For example, DL-PRS reception and/or processing may have a different priority than UL SRS for positioning reception and/or processing. In another example implementation, the method 1200 may include determining an expiration time of the priority. For example, the UE 500 may determine an amount of time for which the UE 500 desires a requested priority, the UE 500 may determine an expiration time based on an instruction from the server 400, and/or the UE 500 may determine an expiration time for a priority determined by the UE 500 without input from the server 400. The processor 510, possibly in combination with the memory 530, in combination with the interface 520 (e.g., the wireless receiver 244 and the antenna 246) may comprise means for determining the expiration time. In another example implementation, the priority may be determined based on whether the positioning session includes exchanging positioning information over a cellular network connection or over a sidelink connection.

Also or alternatively, implementations of the method 1200 may include one or more of the following features. In an example implementation, the priority may be determined based on a priority instruction received by the UE from a network entity. In another example implementation, the method 1200 may include sending a request to the network entity for the priority instruction indicating for the UE to give higher priority to the positioning session. For example, the UE 500 may send the request 762 to the server 400, e.g., requesting a change in priority, e.g., requesting a specific priority such as higher priority for positioning, perhaps for a requested amount of time (e.g., 100 ms). The processor 510, possibly in combination with the memory 530, in combination with the interface 520 (e.g., the wireless transmitter 242 and the antenna 246) may comprise means for sending the request to the network entity. In another example implementation, the priority may be determined such that the positioning session has higher priority than the radio communication session in response to (e.g., based on) a single measurement gap being scheduled. For example, as shown in FIG. 8B, the positioning session 810 may have higher priority based on a single measurement gap 830 being scheduled. In another example implementation, the priority may be determined such that the positioning session has lower priority than the radio communication session in response to (e.g., based on) multiple measurement gaps being scheduled. For example, as shown in FIG. 8C, the positioning session 810 may have lower priority than the radio communication session 820 based on multiple measurement gaps 840, 850 being scheduled.

Also or alternatively, implementations of the method 1200 may include one or more of the following features. In an example implementation, the priority may be determined such that the positioning session has lower priority than the radio communication session for a first measurement gap of multiple scheduled measurement gaps in response to a second measurement gap of the scheduled measurement gaps being dedicated to positioning. For example, as shown in FIG. 8B, multiple measurement gaps 840, 850 may be scheduled, with the positioning session 810 may have lower priority in the measurement gap 840 based on the measurement gap 850 being dedicated to positioning. In another example implementation, the method 1200 may include receiving a measurement-gap indication indicating that the second measurement gap is dedicated to positioning. For example, the configuration message 712 may include an indication that the measurement gap 850 is dedicated to positioning. The processor 510, possibly in combination with the memory 530, in combination with the interface 520 (e.g., the wireless receiver 244 and the antenna 246) may comprise means for receiving the measurement-gap indication. In another example implementation, the method 1200 may include determining that the second measurement gap is implicitly dedicated to positioning. For example, the UE 500 may determine that the measurement gap 850 is dedicated to positioning in response to the measurement gap 850 being longer than a threshold, e.g., 6 ms. The processor 510, possibly in combination with the memory 530, may comprise means for determining that the second measurement gap is implicitly dedicated to positioning.

Also or alternatively, implementations of the method 1200 may include one or more of the following features. In an example implementation, the priority may be determined based on a response time for providing positioning information by the UE in the positioning session. For example, the UE 500 may determine that the positioning session has higher priority based on the response time indicated in the request location information message 722 being less than a threshold amount of time. In another example implementation, the priority may be determined based on a quality-of-service metric for position information to be provided by the UE in the positioning session. For example, the UE 500 may determine that the positioning session has higher or lower priority based on one or more values of one or more QoS parameters in the request location information message 722. In another example implementation, the priority is determined based on whether the UE is scheduled to report position information periodically. For example, the UE 500 may determine the positioning session to have lower priority than the radio communication session based on the UE 500 being scheduled to report position information periodically.

In another example implementation, the priority between the positioning session and the radio communication session is based on whether the radio communication session includes at least one of: a physical downlink control channel signal, a physical downlink shared channel signal, a channel state information reference signal, a sidelink communication, a radio resource management procedure, a downlink data reception procedure, an uplink data transmission procedure, or a channel state information procedure. For example, the UE 500 may determine the positioning session to have lower priority than the radio communication session based on the radio communication session containing one or more of the listed signals and/or one or more of the listed procedures.

Implementation Examples

Implementation examples are provided in the following numbered clauses.

1. A user equipment comprising:
a receiver;
a memory; and
a processor, communicatively coupled to the receiver and the memory, configured to:
identify an expected collision of a positioning session and a radio communication session;
determine a priority between the positioning session and the radio communication session; and
perform at least one of the positioning session or the radio communication session in accordance with the priority.

2. The user equipment of clause 1, wherein the processor is configured to determine the priority based on a positioning technique to be implemented by the processor in the positioning session.

3. The user equipment of clause 2, wherein the processor is configured to determine the priority, in response to the positioning technique being a technique that uses both downlink reference signals and uplink reference signals, such that equal priority relative to the radio communication session is given to downlink positioning reference signal handling and to uplink sounding reference signal for positioning handling.

4. The user equipment of clause 1, wherein the processor is configured to determine the priority such that inequal priorities relative to the radio communication session are given to downlink positioning reference signal handling and to uplink sounding reference signal for positioning handling.

5. The user equipment of clause 1, wherein the processor is configured to determine an expiration time of the priority.

6. The user equipment of clause 1, wherein the processor is configured to determine the priority based on whether the positioning session includes exchanging positioning information over a cellular network connection or over a sidelink connection.

7. The user equipment of clause 1, wherein the processor is configured to determine the priority based on a priority instruction received via the receiver.

8. The user equipment of clause 7, further comprising a transmitter communicatively coupled to the processor, wherein the processor is configured to send a request, via the transmitter, for the priority to give higher priority to the positioning session.

9. The user equipment of clause 1, wherein the processor is configured to determine the priority such that the positioning session has higher priority than the radio communication session in response to a single measurement gap being scheduled.

10. The user equipment of clause 1, wherein the processor is configured to determine the priority such that the positioning session has lower priority than the radio communication session in response to a plurality of measurement gaps being scheduled.

11. The user equipment of clause 1, wherein the processor is configured to determine the priority such that the positioning session has lower priority than the radio communication session for a first measurement gap of a plurality of scheduled measurement gaps in response to a second measurement gap of the plurality of scheduled measurement gaps being dedicated to positioning.

12. The user equipment of clause 11, wherein the processor is configured to receive a measurement-gap indication via the receiver indicating that the second measurement gap is dedicated to positioning.

13. The user equipment of clause 11, wherein the processor is configured to determine that the second measurement gap is implicitly dedicated to positioning.

14. The user equipment of clause 1, wherein the processor is configured to determine the priority based on a response time for providing positioning information by the processor in the positioning session.

15. The user equipment of clause 1, wherein the processor is configured to determine the priority based on a quality-of-service metric for position information to be provided by the processor in the positioning session.

16. The user equipment of clause 1, wherein the processor is configured to determine the priority based on whether the processor is scheduled to report position information periodically.

17. The user equipment of clause 1, wherein the processor is configured to determine the priority between the positioning session and the radio communication session based on whether the radio communication session includes at least one of: a physical downlink control channel signal, a physical downlink shared channel signal, a channel state information reference signal, a sidelink communication, a radio resource management procedure, a downlink data reception procedure, an uplink data transmission procedure, or a channel state information procedure.

18. A method, of prioritized performance of at least one of a positioning session or a radio communication session at a user equipment, comprising:

identifying an expected collision of the positioning session and the radio communication session;

determining a priority between the positioning session and the radio communication session; and performing at least one of the positioning session or the radio communication session in accordance with the priority.

19. The method of clause 18, wherein the priority is determined based on a positioning technique to be implemented by the user equipment in the positioning session.

20. The method of clause 19, wherein the priority is determined, in response to the positioning technique being a technique that uses both downlink reference signals and uplink reference signals, such that equal priority relative to the radio communication session is given to downlink positioning reference signal handling and to uplink sounding reference signal for positioning handling.

21. The method of clause 18, wherein the priority is determined such that inequal priorities relative to the radio communication session are given to downlink positioning reference signal handling and to uplink sounding reference signal for positioning handling.

22. The method of clause 18, further comprising determining an expiration time of the priority.

23. The method of clause 18, wherein the priority is determined based on whether the positioning session includes exchanging positioning information over a cellular network connection or over a sidelink connection.

24. The method of clause 18, wherein the priority is determined based on a priority instruction received by the user equipment from a network entity.

25. The method of clause 24, further comprising sending a request to the network entity for the priority instruction indicating for the user equipment to give higher priority to the positioning session.

26. The method of clause 18, wherein the priority is determined such that the positioning session has higher priority than the radio communication session in response to a single measurement gap being scheduled.

27. The method of clause 18, wherein the priority is determined such that the positioning session has lower priority than the radio communication session in response to a plurality of measurement gaps being scheduled.

28. The method of clause 18, wherein the priority is determined such that the positioning session has lower priority than the radio communication session for a first measurement gap of a plurality of scheduled measurement gaps in response to a second measurement gap of the plurality of scheduled measurement gaps being dedicated to positioning.

29. The method of clause 28, further comprising receiving a measurement-gap indication indicating that the second measurement gap is dedicated to positioning.

30. The method of clause 28, further comprising determining that the second measurement gap is implicitly dedicated to positioning.

31. The method of clause 18, wherein the priority is determined based on a response time for providing positioning information by the user equipment in the positioning session.

32. The method of clause 18, wherein the priority is determined based on a quality-of-service metric for position information to be provided by the user equipment in the positioning session.

33. The method of clause 18, wherein the priority is determined based on whether the user equipment is scheduled to report position information periodically.

34. The method of clause 18, wherein the priority is determined based on whether the radio communication session includes at least one of: a physical downlink control channel signal, a physical downlink shared channel signal, a channel state information reference signal, a sidelink communication, a radio resource management procedure, a downlink data reception procedure, an uplink data transmission procedure, or a channel state information procedure.

35. A user equipment comprising:

means for identifying an expected collision of a positioning session and a radio communication session;

means for determining a priority between the positioning session and the radio communication session; and means for performing at least one of the positioning session or the radio communication session in accordance with the priority.

36. The user equipment of clause 35, wherein the means for determining the priority comprise means for determining the priority based on a positioning technique to be implemented in the positioning session by the means for performing at least one of the positioning session or the radio communication session.

37. The user equipment of clause 36, wherein the means for determining the priority comprise means for determining the priority, in response to the positioning technique being a technique that uses both downlink reference signals and uplink reference signals, such that equal priority relative to the radio communication session is given to downlink positioning reference signal handling and to uplink sounding reference signal for positioning handling.

38. The user equipment of clause 35, wherein the means for determining the priority comprise means for determining the priority such that inequal priorities relative to the radio communication session are given to downlink positioning reference signal handling and to uplink sounding reference signal for positioning handling.

39. The user equipment of clause 35, wherein the means for determining the priority comprise means for determining an expiration time of the priority.

40. The user equipment of clause 35, wherein the means for determining the priority comprise means for determining the priority based on whether the positioning session includes exchanging positioning information over a cellular network connection or over a sidelink connection.

41. The user equipment of clause 35, wherein the means for determining the priority means comprise means for determining the priority based on a priority instruction received by the user equipment.

42. The user equipment of clause 41, further comprising means for sending a request to a network entity for the priority instruction indicating for the user equipment to give higher priority to the positioning session.

43. The user equipment of clause 35, wherein the means for determining the priority means comprise means for determining the priority such that the positioning session has higher priority than the radio communication session in response to a single measurement gap being scheduled.

44. The user equipment of clause 35, wherein the means for determining the priority means comprise means for determining the priority such that the positioning session has lower priority than the radio communication session in response to a plurality of measurement gaps being scheduled.

45. The user equipment of clause 35, wherein the means for determining the priority means comprise means for determining the priority such that the positioning session has lower priority than the radio communication session for a first measurement gap of a plurality of scheduled measurement gaps in response to a second measurement gap of the plurality of scheduled measurement gaps being dedicated to positioning.

46. The user equipment of clause 45, wherein the means for determining the priority means comprise means for receiving a measurement-gap indication indicating that the second measurement gap is dedicated to positioning.

47. The user equipment of clause 45, wherein the means for determining the priority means comprise means for determining that the second measurement gap is implicitly dedicated to positioning.

48. The user equipment of clause 35, wherein the means for determining the priority means comprise means for determining the priority based on a response time for providing positioning information by the user equipment in the positioning session.

49. The user equipment of clause 35, wherein the means for determining the priority means comprise means for determining the priority based on a quality-of-service metric for position information to be provided by the user equipment in the positioning session.

50. The user equipment of clause 35, wherein the means for determining the priority means comprise means for determining the priority based on whether the user equipment is scheduled to report position information periodically.

51. The user equipment of clause 35, wherein the means for determining the priority means comprise means for determining the priority between the positioning session and the radio communication session based on whether the radio communication session includes at least one of: a physical downlink control channel signal, a physical downlink shared channel signal, a channel state information reference signal, a sidelink communication, a radio resource management procedure, a downlink data reception procedure, an uplink data transmission procedure, or a channel state information procedure.

52. A non-transitory, processor-readable storage medium comprising processor-readable instructions to cause a processor, in order to prioritize performance of at least one of a positioning session or a radio communication session at a user equipment, to:

identify an expected collision of the positioning session and the radio communication session;

determine a priority between the positioning session and the radio communication session; and perform at least one of the positioning session or the radio communication session in accordance with the priority.

53. The storage medium of clause 52, wherein the processor-readable instructions to cause the processor to determine the priority comprise processor-readable instructions to cause the processor to determine the priority based on a positioning technique to be implemented by the user equipment in the positioning session.

54. The storage medium of clause 53, wherein the processor-readable instructions to cause the processor to determine the priority comprise processor-readable instructions to cause the processor to determine the priority, in response to the positioning technique being a technique that uses both downlink reference signals and uplink reference signals, such that equal priority relative to the radio communication session is given to downlink positioning reference signal handling and to uplink sounding reference signal for positioning handling.

55. The storage medium of clause 52, wherein the processor-readable instructions to cause the processor to determine the priority comprise processor-readable instructions to cause the processor to determine the priority such that inequal priorities relative to the radio communication session are given to downlink positioning reference signal handling and to uplink sounding reference signal for positioning handling.

56. The storage medium of clause 52, further comprising processor-readable instructions to cause the processor to determine an expiration time of the priority.

57. The storage medium of clause 52, wherein the processor-readable instructions to cause the processor to determine the priority comprise processor-readable instructions to cause the processor to determine the priority based on whether the positioning session includes exchanging positioning information over a cellular network connection or over a sidelink connection.

58. The storage medium of clause 52, wherein the processor-readable instructions to cause the processor to determine the priority comprise processor-readable instructions to cause the processor to determine the priority based on a priority instruction received by the user equipment from a network entity.

59. The storage medium of clause 58, further comprising processor-readable instructions to cause the user equipment to send a request to the network entity for the priority instruction indicating for the user equipment to give higher priority to the positioning session.

60. The storage medium of clause 52, wherein the processor-readable instructions to cause the processor to determine the priority comprise processor-readable instructions to cause the processor to determine the priority such that the positioning session has higher priority than the radio communication session in response to a single measurement gap being scheduled.

61. The storage medium of clause 52, wherein the processor-readable instructions to cause the processor to determine the priority comprise processor-readable instructions to cause the processor to determine the priority such that the positioning session has lower priority than the radio communication session in response to a plurality of measurement gaps being scheduled.

62. The storage medium of clause 52, wherein the processor-readable instructions to cause the processor to determine the priority comprise processor-readable instructions to cause the processor to determine the priority such that the positioning session has lower priority than the radio communication session for a first measurement gap of a plurality of scheduled measurement gaps in response to a second measurement gap of the plurality of scheduled measurement gaps being dedicated to positioning.

63. The storage medium of clause 62, further comprising processor-readable instructions to cause the processor to receive a measurement-gap indication indicating that the second measurement gap is dedicated to positioning.

64. The storage medium of clause 62, further comprising processor-readable instructions to cause the processor to determine that the second measurement gap is implicitly dedicated to positioning.

65. The storage medium of clause 52, wherein the processor-readable instructions to cause the processor to determine the priority comprise processor-readable instructions to cause the processor to determine the priority based on a response time for providing positioning information by the user equipment in the positioning session.

66. The storage medium of clause 52, wherein the processor-readable instructions to cause the processor to determine the priority comprise processor-readable instructions to cause the processor to determine the priority based on a quality-of-service metric for position information to be provided by the user equipment in the positioning session.

67. The storage medium of clause 52, wherein the processor-readable instructions to cause the processor to determine the priority comprise processor-readable instructions to cause the processor to determine the priority based on whether the user equipment is scheduled to report position information periodically.

68. The storage medium of clause 52, wherein the processor-readable instructions to cause the processor to determine the priority comprise processor-readable instructions to cause the processor to determine the priority based on whether the radio communication session includes at least one of: a physical downlink control channel signal, a physical downlink shared channel signal, a channel state information reference signal, a sidelink communication, a radio resource management procedure, a downlink data reception procedure, an uplink data transmission procedure, or a channel state information procedure.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A user equipment comprising:
one or more receivers;
one or more memories; and
one or more processors, communicatively coupled to the one or more receiver and the one or more memories, configured to:
identify an expected collision of a positioning session and a radio communication session;
determine a priority between the positioning session and the radio communication session based on at least one of a scheduled measurement gap being dedicated to positioning, or an absence of a scheduled measurement gap being dedicated to positioning; and
perform at least one of the positioning session or the radio communication session in accordance with the priority.

2. The user equipment of claim 1, wherein the one or more processors are configured to determine the priority, in response to a positioning technique being a technique that uses both downlink reference signals and uplink reference signals, such that equal priority relative to the radio communication session is given to downlink positioning reference signal handling and to uplink sounding reference signal for positioning handling.

3. The user equipment of claim 1, wherein the one or more processors are configured to determine the priority such that inequal priorities relative to the radio communication session are given to downlink positioning reference signal handling and to uplink sounding reference signal for positioning handling.

4. The user equipment of claim 1, wherein the one or more processors are configured to determine an expiration time of the priority.

5. The user equipment of claim 1, wherein the one or more processors are configured to determine the priority based on whether the positioning session includes exchanging positioning information over a cellular network connection or over a sidelink connection.

6. The user equipment of claim 1, wherein the one or more processors are configured to determine the priority based on a priority instruction received via the one or more receivers.

7. The user equipment of claim 6, further comprising one or more transmitters communicatively coupled to the one or more processors, wherein the one or more processors are configured to send a request, via the one or more transmitters, for the priority to give higher priority to the positioning session.

8. The user equipment of claim 1, wherein the one or more processors are configured to determine the priority such that the positioning session has higher priority than the radio communication session in response to a single measurement gap being scheduled.

9. The user equipment of claim 1, wherein the one or more processors are configured to determine the priority such that the positioning session has lower priority than the radio communication session in response to a plurality of measurement gaps being scheduled.

10. The user equipment of claim 1, wherein the one or more processors are configured to determine the priority such that the positioning session has lower priority than the radio communication session for a first measurement gap of a plurality of scheduled measurement gaps in response to a second measurement gap of the plurality of scheduled measurement gaps being dedicated to positioning.

11. The user equipment of claim 1, wherein the one or more processors are configured to determine the priority based on a quality-of-service metric for position information to be provided by the one or more processors in the positioning session.

12. The user equipment of claim 1, wherein the one or more processors are configured to determine the priority between the positioning session and the radio communication session based on whether the radio communication session includes at least one of: a physical downlink control channel signal, a physical downlink shared channel signal, a channel state information reference signal, a sidelink communication, a radio resource management procedure, a downlink data reception procedure, an uplink data transmission procedure, or a channel state information procedure.

13. A method, of prioritized performance of at least one of a positioning session or a radio communication session at a user equipment, comprising:

identifying an expected collision of the positioning session and the radio communication session;

determining a priority between the positioning session and the radio communication session based on at least one of a scheduled measurement gap being dedicated to positioning, or an absence of a scheduled measurement gap being dedicated to positioning; and performing at least one of the positioning session or the radio communication session in accordance with the priority.

14. The method of claim 13, wherein the priority is determined, in response to a positioning technique being a technique that uses both downlink reference signals and uplink reference signals, such that equal priority relative to the radio communication session is given to downlink positioning reference signal handling and to uplink sounding reference signal for positioning handling.

15. The method of claim 13, wherein the priority is determined such that inequal priorities relative to the radio communication session are given to downlink positioning reference signal handling and to uplink sounding reference signal for positioning handling.

16. The method of claim 13, further comprising determining an expiration time of the priority.

17. The method of claim 13, wherein the priority is determined based on whether the positioning session includes exchanging positioning information over a cellular network connection or over a sidelink connection.

18. The method of claim 13, wherein the priority is determined based on a priority instruction received by the user equipment from a network entity.

19. The method of claim 18, further comprising sending a request to the network entity for the priority instruction indicating for the user equipment to give higher priority to the positioning session.

20. The method of claim 13, wherein the priority is determined such that the positioning session has higher priority than the radio communication session in response to a single measurement gap being scheduled.

21. The method of claim 13, wherein the priority is determined such that the positioning session has lower priority than the radio communication session in response to a plurality of measurement gaps being scheduled.

22. The method of claim 13, wherein the priority is determined such that the positioning session has lower priority than the radio communication session for a first measurement gap of a plurality of scheduled measurement gaps in response to a second measurement gap of the plurality of scheduled measurement gaps being dedicated to positioning.

23. The method of claim 13, wherein the priority is determined based on a quality-of-service metric for position information to be provided by the user equipment in the positioning session.

24. The method of claim 13, wherein the priority is determined based on whether the radio communication session includes at least one of: a physical downlink control channel signal, a physical downlink shared channel signal, a channel state information reference signal, a sidelink communication, a radio resource management procedure, a downlink data reception procedure, an uplink data transmission procedure, or a channel state information procedure.

25. A user equipment comprising:

means for identifying an expected collision of a positioning session and a radio communication session;

means for determining a priority between the positioning session and the radio communication session based on at least one of a scheduled measurement gap being dedicated to positioning, or an absence of a scheduled measurement gap being dedicated to positioning; and means for performing at least one of the positioning session or the radio communication session in accordance with the priority.

26. A non-transitory, processor-readable storage medium comprising processor-readable instructions to cause one or more processors, in order to prioritize performance of at least one of a positioning session or a radio communication session at a user equipment, to:

identify an expected collision of the positioning session and the radio communication session;

determine a priority between the positioning session and the radio communication session based on at least one of a scheduled measurement gap being dedicated to positioning, or an absence of a scheduled measurement gap being dedicated to positioning; and perform at least one of the positioning session or the radio communication session in accordance with the priority.

* * * * *